(12) United States Patent
Ma

(10) Patent No.: US 11,963,475 B2
(45) Date of Patent: Apr. 23, 2024

(54) PLANT PROTECTION AND MANAGEMENT SYSTEMS FOR CENTER PIVOT AND LINEAR IRRIGATION SYSTEM

(71) Applicants: Jun Ma, Beijing (CN); Irritech Agricultural Equipment Co., Ltd., Wuhu (CN)

(72) Inventor: Jun Ma, Beijing (CN)

(73) Assignees: Jun Ma, Beijing (CN); Irritech Agricultural Equipment Co., Ltd., Wuhu (CN)

( * ) Notice: Subject to any disclaimer, the term of this patent is extended or adjusted under 35 U.S.C. 154(b) by 296 days.

(21) Appl. No.: 17/566,526

(22) Filed: Dec. 30, 2021

(65) Prior Publication Data

US 2022/0117152 A1    Apr. 21, 2022

Related U.S. Application Data

(63) Continuation-in-part of application No. PCT/CN2020/138641, filed on Dec. 23, 2020.

(30) Foreign Application Priority Data

Dec. 28, 2019  (CN) .......................... 201911384037.8
Sep. 30, 2020  (CN) .......................... 202011064868.X
Aug. 18, 2021  (CN) .......................... 202110951874.5

(51) Int. Cl.
*A01C 23/04*    (2006.01)
*A01C 7/16*     (2006.01)
(Continued)

(52) U.S. Cl.
CPC ............ *A01C 23/047* (2013.01); *A01C 7/166* (2013.01); *A01C 21/00* (2013.01); *A01C 23/008* (2013.01);
(Continued)

(58) Field of Classification Search
CPC ........................... A01C 23/008; A01C 23/047
See application file for complete search history.

(56) References Cited

U.S. PATENT DOCUMENTS

| 2015/0041160 A1* | 2/2015 | Zimmerman | ........ A01B 63/004 |
| | | | 172/709 |
| 2017/0274400 A1* | 9/2017 | Kowalchuk | ........... B05B 12/008 |
| (Continued) | | | |

FOREIGN PATENT DOCUMENTS

| CN | 2676614 Y | 2/2005 |
| CN | 102091681 A | 6/2011 |
| (Continued) | | |

OTHER PUBLICATIONS

Second Office Action issued in counterpart Chinese Patent Application No. 202011064868.X, dated Aug. 29, 2022.
(Continued)

*Primary Examiner* — J C Jacyna
(74) *Attorney, Agent, or Firm* — Westbridge IP LLC

(57) ABSTRACT

Disclosed is a plant protection and management system for a center pivot and linear irrigation system. In the plant protection and management system, the movable platform is configured to provide at least one of an application unit, a seeding-fertilizer spreader unit or a monitoring unit. The application unit is configured to spray agriculture chemicals or fertilizers on crops. The seeding-fertilizer spreader unit is configured to sow seeds of crops. Further, the monitoring unit is configured to monitor crops and collect status data of the crops or status data of environment. According to different requirements on agricultural production, at least one of the application unit, the sowing unit or the monitoring (Continued)

unit can be selectively arranged on the movable platform so as to meet various requirements on plant protections and managements in the process of agricultural production.

20 Claims, 26 Drawing Sheets

(51) Int. Cl.
 *A01C 21/00* (2006.01)
 *A01C 23/00* (2006.01)
 *A01G 25/09* (2006.01)
 *A01G 25/16* (2006.01)
 *A01M 7/00* (2006.01)

(52) U.S. Cl.
 CPC .......... *A01G 25/092* (2013.01); *A01G 25/16* (2013.01); *A01M 7/0042* (2013.01); *A01M 7/0071* (2013.01); *A01M 7/0085* (2013.01); *A01M 7/0089* (2013.01)

(56) References Cited

U.S. PATENT DOCUMENTS

| | | | |
|---|---|---|---|
| 2017/0347520 A1* | 12/2017 | Alig | B65H 75/4489 |
| 2017/0354137 A1* | 12/2017 | Dahlhauser | A01M 7/0064 |
| 2018/0243772 A1* | 8/2018 | Davis | A01C 21/005 |
| 2019/0021210 A1* | 1/2019 | Fast | A01B 59/04 |
| 2021/0051943 A1* | 2/2021 | Bittner | B05B 1/202 |
| 2022/0132721 A1* | 5/2022 | Miller | A01B 69/008 47/48.5 |

FOREIGN PATENT DOCUMENTS

| | | |
|---|---|---|
| CN | 203554982 U | 4/2014 |
| CN | 204180016 U | 2/2015 |
| CN | 206043015 U | 3/2017 |
| CN | 107258740 A | 10/2017 |
| CN | 107517785 A | 12/2017 |
| CN | 206977991 U | 2/2018 |
| CN | 108112315 A | 6/2018 |
| CN | 109496799 A | 3/2019 |
| CN | 110301418 A | 10/2019 |

OTHER PUBLICATIONS

First Office Action issued in counterpart Chinese Patent Application No. 202011064868.X, dated Nov. 3, 2021.
International Preliminary Report issued in corresponding PCT Application No. PCT/CN2020/138641, dated Jun. 28, 2022.

\* cited by examiner

PLANT PROTECTION AND MANAGEMENT SYSTEMS FOR CENTER PIVOT AND LINEAR IRRIGATION SYSTEM

CROSS-REFERENCE TO RELATED APPLICATIONS

The present application is a continuation-in-part of International Application No. PCT/CN2020/138641 entitled "Plant Protection Systems for Irrigation System" filed on Dec. 23, 2020, which claims priority of Chinese Patent Applications No. 201911384037.8 filed on Dec. 28, 2019, and No. 202011064868.X filed on Sep. 30, 2020. The present application also claims priority of Chinese Patent Application No. 202110951874.5, filed on Aug. 18, 2021. All of the aforementioned patent applications are hereby incorporated by reference in their entireties.

TECHNICAL FIELD

The present disclosure relates to the technical field of agricultural machinery, in particular to plant protection and management systems mounted on a center pivot and linear irrigation system.

BACKGROUND

With the development of productivity, intensive degree of agricultural production is continuously improved, and applications of a center pivot and linear irrigation system are increasingly widespread. The center pivot and linear irrigation system have many advantages, such as high irrigation efficiency, water resources saving and labor saving. Therefore, center pivot and linear irrigation systems are particularly suitable for large-scale agricultural plantings. However, in agricultural productions, in addition to basic needs of irrigation, there are many other requirements such as agricultural chemicals application, seeds sowing, monitoring, and etc.

Therefore, how to extend the functions of the center pivot and linear irrigation system to meet the needs of plant protection and management in agricultural production becomes an urgent issue.

SUMMARY

In view of the above, some examples of the present disclosure provide a plant protection and management system for a center pivot and linear irrigation system.

According to some examples of the present disclosure, the center pivot and linear irrigation system may include at least two towers sequentially arranged at intervals, and a span structure which spans between at least two towers.

In these examples, the plant protection and management system may include a movable platform and a transport assembly.

Where the transport assembly is configured to function as a track on which the movable platform moves along the span structure.

The movable platform is configured to provide at least one of an application unit, a chemical application unit, seeding-fertilizer spreader unit or a monitoring unit.

As can be seen from the foregoing description, the present disclosure provides a plant protection and management system for a center pivot and linear irrigation system, wherein a movable platform is provided for at least one of an application unit, a chemical application unit or a monitoring unit. In this example, the application unit is configured to spray agricultural chemicals or fertilizers on crops. The seeding-fertilizer spreader unit is configured to sow seeds of crops. Further, the monitoring unit is configured to monitor crops and collect status data of the crops or status data of environment. The transport assembly is configured to carry the movable platform along the span structure. Based on different implementation requirements, at least one of the application unit, the seeding-fertilizer spreader unit or the monitoring unit can be selectively arranged on the movable platform. Therefore, different functions of plant protection and management can be implemented.

BRIEF DESCRIPTION OF DRAWINGS

In order to illustrate examples of the present disclosure or the prior art more clearly, references will now be made to accompanying drawings which form a part hereof, and in which it will be apparent to those skilled in the art that the drawings described below are merely examples of the present disclosure, and that other drawings may be made without inventive effort.

DETAILED DESCRIPTION OF THE EMBODIMENTS

For a better understanding of the objects, aspects and advantages of the present disclosure, references will now be made to the following detailed description taken in conjunction with the accompanying drawings.

It should be noted that, unless defined otherwise, technician or scientific terms used in connection with examples of the present disclosure shall have ordinary meanings understood by those skilled in the art to which this disclosure belongs. As used in this disclosure, the terms "first", "second" and the like do not denote any order, quantity, or importance, but rather are used to distinguish one element from another. The word "comprise", "include" or the like means that an element or an article preceded by the word is inclusive of elements or articles listed after the word and their equivalents, however does not exclude other elements or articles. Similar terms such as "connect" is not limited to physical or mechanical connections, but may also include electrical connections, whether direct or indirect. "Above", "under", "left" and "right" are used merely to denote relative positional relationships, which may change accordingly when an absolute position of an object being described changes.

Figure 1:
FIG. 1 is a schematic diagram of a linear irrigation system.
Figure 2:
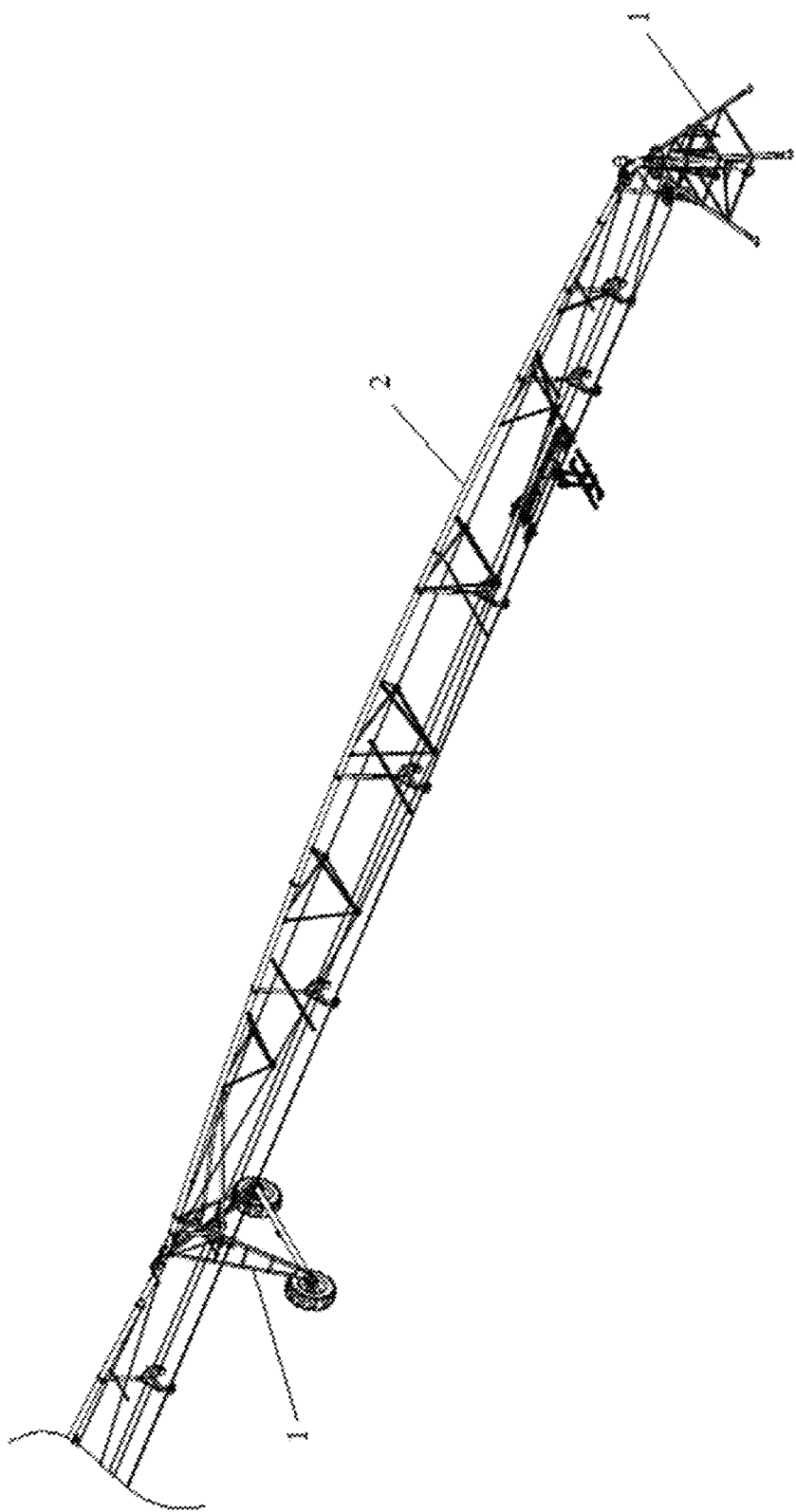
FIG. 2 is a schematic diagram of a center pivot irrigation system.

Some examples of the present disclosure provide a plant protection and management system applied to a center pivot and linear irrigation system. According to some examples of the present disclosure, FIG. 1 is a schematic diagram of a linear irrigation system. FIG. 2 is a schematic diagram of a center pivot irrigation system. According to some examples of the present disclosure, the center pivot and linear irrigation system may include at least two towers 1 which are sequentially arranged at intervals, and a span structure 2 which spans between the at least two towers 1. The at least two towers 1 and the span structure 2 form an arched structure of the center pivot and linear irrigation system. On condition that the irrigation system is a linear irrigation system, wheels may be installed at the bottom of the at least two towers 1. The linear irrigation system then can move under the driving of the wheels. On condition that the center pivot irrigation system with a central point, any one of the at least two towers 1 can be set as a central tower. The position of the central tower is fixed on pivot pad. Wheels may be installed at the bottom of other towers 1 except the central tower. The span structure 2 then can be driven to rotate taking the central tower as a circle center.

According to some examples of the present disclosure, the plant protection and management system may include a movable platform and a transport assembly. The movable platform is configured to provide at least one of an application unit, a seeding-fertilizer spreader unit or a monitoring unit. The application unit is configured to spray agricultural chemicals or fertilizers on crops. The seeding-fertilizer spreader unit is configured to sow seeds of crops or to spray fertilizers to the field. Further, the monitoring unit is configured to monitor crops and collect status data of the crops or status data of environment. The transport assembly is configured to function as a track on which the movable platform moves along the span structure 2. According to different implementation requirements, at least one of the application unit, the seeding-fertilizer spreader unit or the monitoring unit can be selected to be arranged on the movable platform.

In some examples of the present disclosure, the application unit may include a storage tank, an application pump and an application assembly. Where the storage tank, the application pump and the application assembly are arranged on the movable platform. In these examples, the movable platform provides spaces for carrying and installing any one of or all the components of the application unit. In some examples of the present disclosure, the movable platform can be a frame structure formed by rigidly connected members such as beams and columns. In some examples of the present disclosure, the storage tank is configured to store agriculture chemicals or fertilizers. In some examples of the present disclosure, the storage tank may be connected to the application assembly through the application pump. Further, the storage tank, the application pump and the application assembly may be connected through pipelines. When application operations are carried out, the application pump may pump and transport agriculture chemicals or fertilizers stored in the storage tank to the application assembly, and then the application assembly may spray the agriculture chemicals or fertilizers transported. In some examples of the present disclosure, the application assembly may be a nozzle, a spray head or the like.

In some examples of the present disclosure, the movable platform may be connected to the span structure through the transport assembly and can move along the span structure through driving on the transport assembly. In this case, agriculture chemicals applications or fertilizer applications on crops in a farmland within the range where the span structure covers can be realized.

Figure 3:
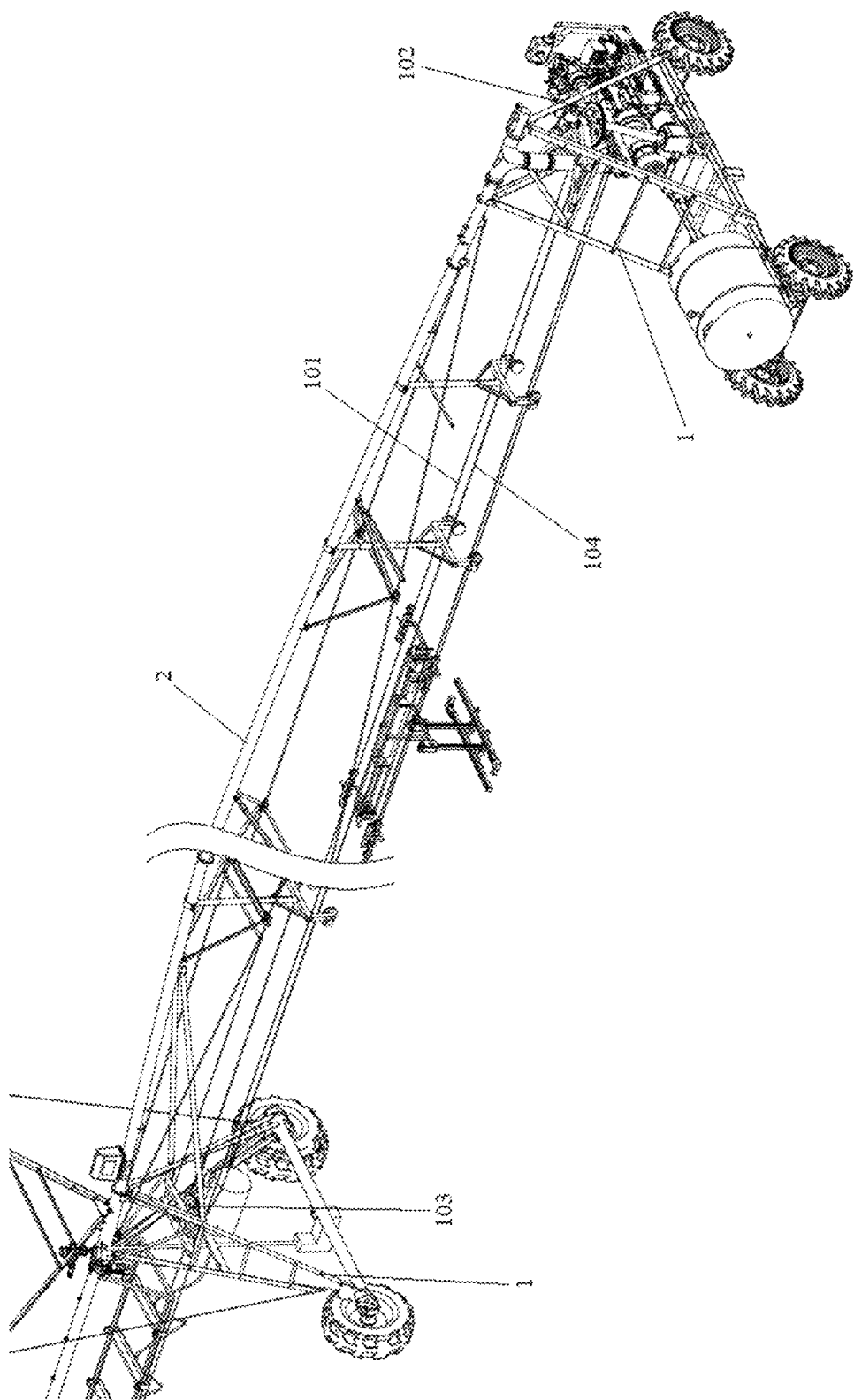
FIG. 3 is a structure diagram of a transport assembly according to some examples of the present disclosure.
Figure 4:
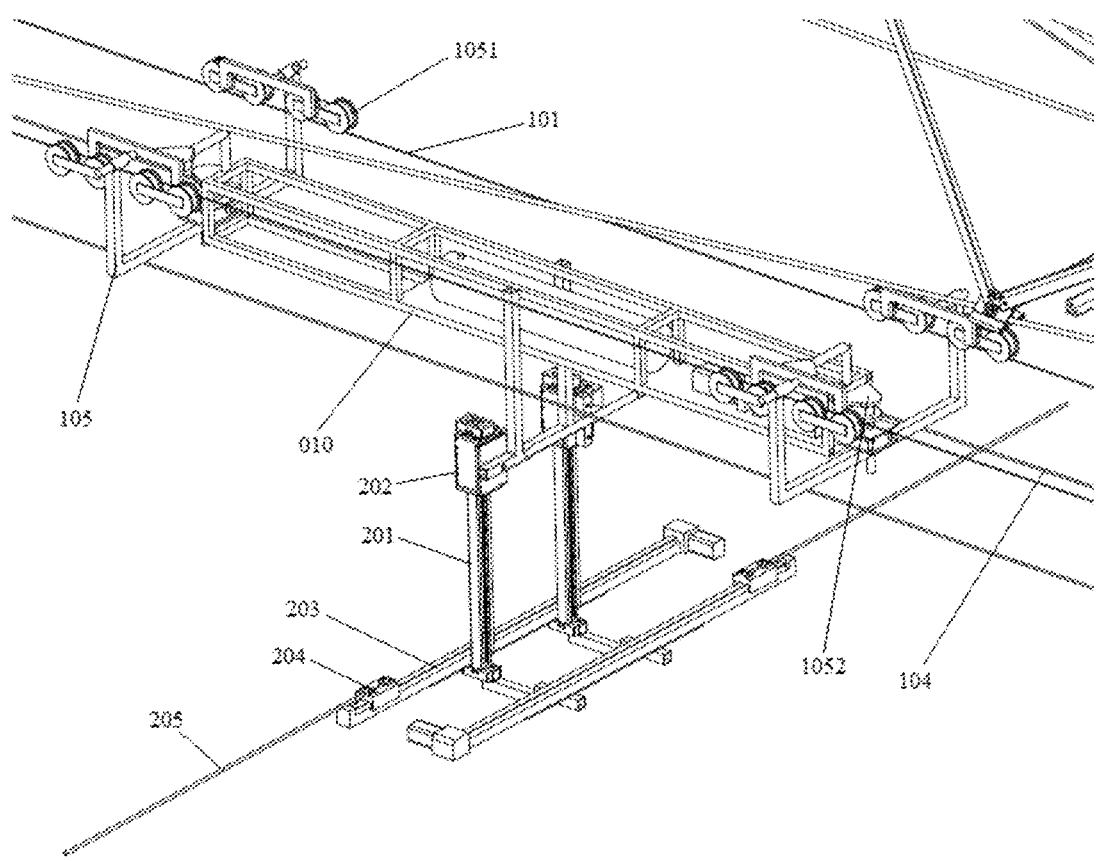
FIG. 4 is a detailed structure diagram of the transport assembly shown in FIG. 3.

As an example, with reference to FIG. 3 and FIG. 4, the transport assembly may include a first supporting cable 101, a first driving wheel 102, a first driven wheel 103, a first moving cable 104 and a connecting frame 105. Wherein, the first supporting cable 101 extends between the at least two towers 1 and is configured to support the movable platform 010. The first driving wheel 102 may be arranged on any one of the at least two towers 1. Specifically, the first driving wheel 102 can be arranged on the central tower in case that the irrigation system is a center pivot irrigation system or be arranged on a lateral move linear irrigation system. Further, the first driving wheel 102 may connect to a geared motor. The first driven wheel 103 may be arranged on any one of the at least two towers 1 other than the tower on which the first driving wheel 102 is arranged. According to some examples of the present disclosure, the first driven wheel 103 may be arranged on an outermost tower. The first moving cable 104 may be wound around the first driving wheel 102 and the first driven wheel 103. Tension of the first moving cable 104 can be realized by adjusting positions of the first driving wheel 102 and the first driven wheel 103. Further, the first moving cable 104 can be positioned above the first supporting cable 101. The geared motor may output power to drive the first driving wheel 102 to rotate so as to drive the first moving cable 104 to reciprocate between the first driving wheel 102 and the first driven wheel 103.

The connecting frame 105 may be configured to connect the movable platform 010 with the first supporting cable 101 and the first moving cable 104. Specifically, one end of the connecting frame 105 may extend in a direction of the first supporting cable 101. Further, the connecting frame 105 may be provided with a first roller set 1051 which can be connected to the first supporting cable 101 in a rotatable manner. In this example, the first supporting cable 101 has been pre-tensioned so as to allow the movable platform 010 move on the first supporting cable 101 while driven by rotations of rollers of the first roller set 1051. The first roller set 1051 cannot only fix the first supporting cable 101 but also can prevent hard collisions of moving rollers in consideration of approach angles and departure angles of the moving rollers. The other end of the connecting frame 105 may be connected to and also be removed from the first moving cable 104. Specifically, the connection of the connecting frame 105 and the first moving cable 104 can be accomplished by a detachable connector such as a rope clip. In addition, the other end of the connecting frame 105 may also be connected to the movable platform 010 by a bogie truck 1052. This connection allows the movable platform 010 to accommodate relative positional changes with the first supporting cable 101 during its movement.

In operations, the geared motor may output power to drive the first driving wheel 102 to rotate so as to drive the first moving cable 104 to reciprocate between the first driving wheel 102 and the first driven wheel 103. Since the movable platform 010 is fixed on the first moving cable 104, the movable platform 010 may move together with first moving cable 104. During the movement of the movable platform 010, the first roller set 1051 of the connecting frame 105 may roll along the first supporting cable 101. Thus, supportation of the movable platform 010 may be implemented by the first supporting cable 101.

In some examples of the present disclosure, the movable platform 010 can be supported by the first supporting cable 101 and driven by the first moving cable 104. In these examples, the moving stability of the movable platform 010 can be effectively improved, and the life of cables can be ensured.

In some examples of the present disclosure, with reference to FIG. 4, the application unit may further include a first linear module and a second linear module. The first linear module may be configured to ensure the application assembly moving in a vertical direction, and the second linear module may be configured to ensure the application assembly moving in a horizontal direction. In addition, the storage tank of the application unit, other controlling devices, storage batteries and etc. may be arranged on the movable platform 010.

Specifically, according to some examples of the present disclosure, the first linear module may include a first guide rod 201 arranged along a vertical direction, and a first moving block 202 arranged on the first guide rod 201 in a sliding manner. Further, the first moving block 202 may be fixed on the movable platform 010. In this example, when the first linear module works, the first moving block 202 may be taken as a fixed point, and the first guide rod 201 can move up and down in the vertical direction. According to some examples of the present disclosure, the second linear module may include a second guide rod 203 arranged along a horizontal direction, and a second moving block 204 arranged on the second guide rod 203 in a sliding manner. The second guide rod 203 may be disposed in a direction perpendicular to the first guide rod 201 and may be disposed at any position on the first guide rod 201 such as an upper end, a lower end, and etc. When the first guide rod 201 moves vertically, the second linear module may be driven to move vertically. In some examples of the present disclosure, the application assembly may further include an application rod 205. The application rod 205 may be disposed at the second moving block 204 and can move along the second guide rod 203 with the second moving block 204. A plurality of spray heads or outlet holes can be distributed on the application rod 205 to realize agriculture chemicals applications or fertilizer applications on crops.

During operations, the position of the application rod 205 may be adjusted through the first linear module and the second linear module. Specifically, when the vertical position of the application rod 205 needs to be adjusted, the first linear module is operated to move the first guide rod 201 and the second linear module in the vertical direction. Thereby the vertical position of the application rod 205 on the second moving block 204 can be adjusted. When the horizontal position of the application rod 205 needs to be adjusted, the second linear module is operated to move the second moving block 204 with the application rod 205 in the horizontal direction along the second guide rod 203. Thereby, the horizontal position of the application rod 205 can be adjusted.

In particular, a main function of the second linear module is to control a spraying amplitude of the application rod 205 and to avoid collision with towers 1. When the application unit of the present disclosure is applied to a center pivot or Linear irrigation system, a fan-shaped area can be obstacle in each operation according to the moving direction of the application unit. Moreover, different spraying amplitudes can be adopted at different positions of the movable platform 010. Any of the at least two towers 1 may have a triangular structure in the moving direction of the movable platform 010. The higher the relative position of the second linear module, the smaller the width which can be passed. Therefore, through stretching and retracting of the second linear module, the adjustment of the spraying amplitude of the application rod 205 can be realized and the at least two towers 1 can also be avoided.

Figure 5:
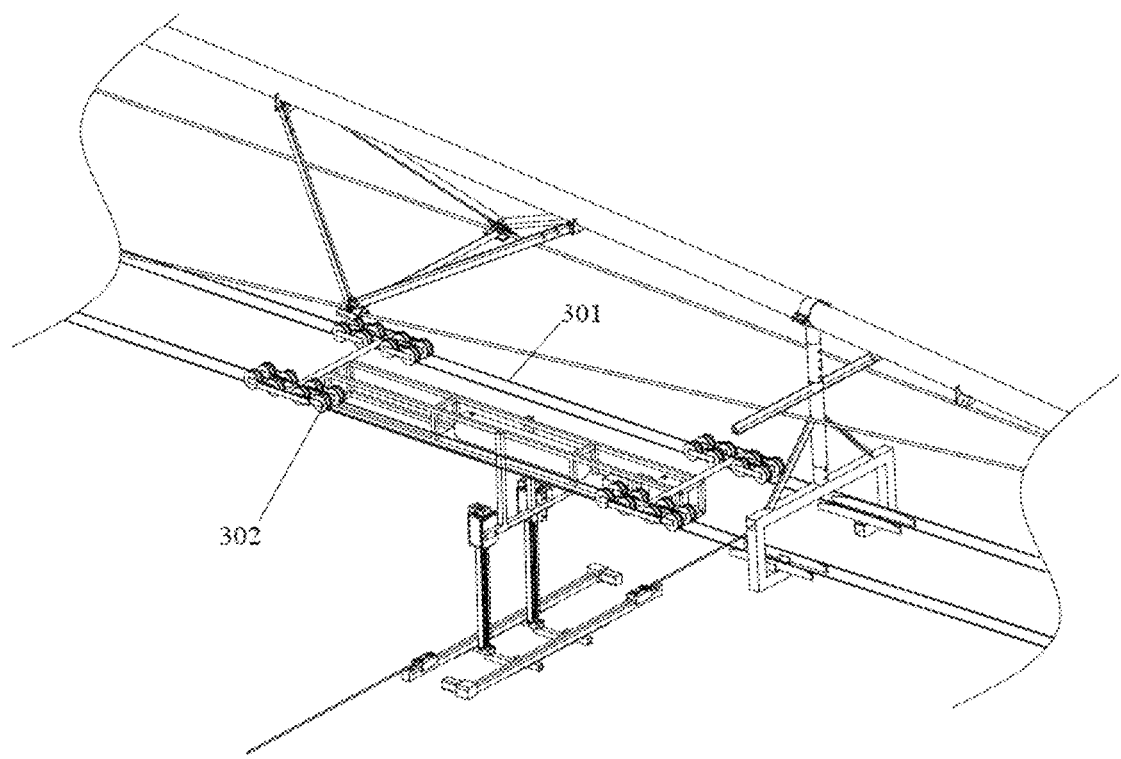
FIG. 5 is a structure diagram of another transport assembly according to some other examples of the present disclosure.
Figure 6:
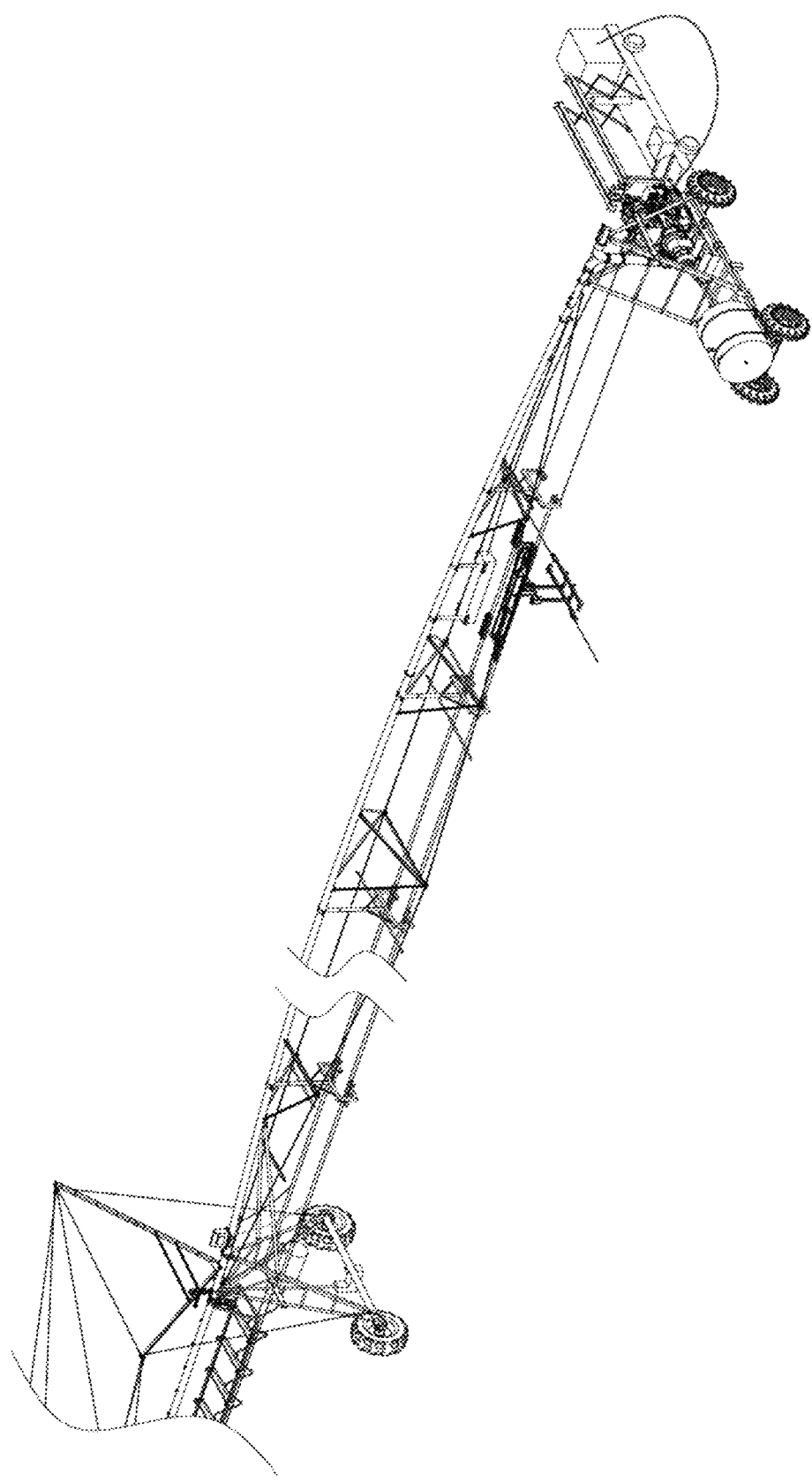
FIG. 6 is a schematic view of a plant protection and management system employing the transport assembly shown in FIG. 5.

As an alternative example, with reference to FIG. 5, the transport assembly may include a second supporting cable 301 which extends between the at least two towers 1. The movable platform 010 may be connected to the second supporting cable 301 in a rotatable manner through a second roller set 302. On the one hand, the second supporting cable 301 may function as a track to define a moving path of the movable platform 010 between the at least two towers 1. On the other hand, the second supporting cable 301 may be connected with the movable platform 010 by supporting the second roller set 302. In some examples of the present disclosure, the second supporting cable 301 may specifically have four cables. Each pair of the four cables can be arranged on either side of the span structure taking the span structure as a center line. Correspondingly, the second roller set 302 may have four groups of rollers. Each group of rollers may correspond to one pair of cables of the second supporting cable 301. Each group of rollers may have eight rollers. Further, each four rollers in Each group of rollers may be arranged on one cable of the second supporting cable 301. It should be noted that the number of cables of the second supporting cable 301 and the number of rollers of the second roller set 302 may be set as any other suitable numbers in other implementations. In some examples of the present disclosure, the application unit can adopt the structure shown in FIG. 5, which includes the first linear module and the second linear module. The operation style of the application unit can also refer to the examples described before. FIG. 6 is an overall schematic diagram of a plant protection and management system employing the transport assembly described.

In operations, the power to move the movable platform 010 is derived from power provided by the second supporting cable 301. In some examples of the present disclosure, the second supporting cable 301 may have four cables. Any two or four of the cables of the second supporting cable 301 can be selected as power supply lines for the movable platform 010 according to actual energy consumptions. The power provided by the second supporting cable 301 may be 36V to 48V direct current. The second supporting cable 301 may collect electric energy to power the movable platform 010 through a collecting wheel or a carbon brush in the second roller set 302. In consideration that voltage may drop, the second supporting cable 301 may draw power from control tower boxes disposed on the at least two towers 1 at intervals. In this example, a transformer may be installed in the control tower box to convert a voltage of 110V AC or 220V AC in the center pivot and linear irrigation system into a voltage of 36V DC to 48V DC for power supply.

In an alternative example, the plant protection and management system may further include a secondary application unit. The secondary application unit may be disposed on an outmost tower of the at least two towers 1. In the above examples, when an application operation is carried out, the application can be implemented by the application unit disposed on the movable platform which can move along the span structure. Therefore, the range of the application is limited by the range covered by the span structure. However, in this example, one or two secondary application units can be arranged on the outmost tower(s). The secondary application unit may work in a space away from the span structure. Therefore, the range of the application can be expanded.

Figure 7:
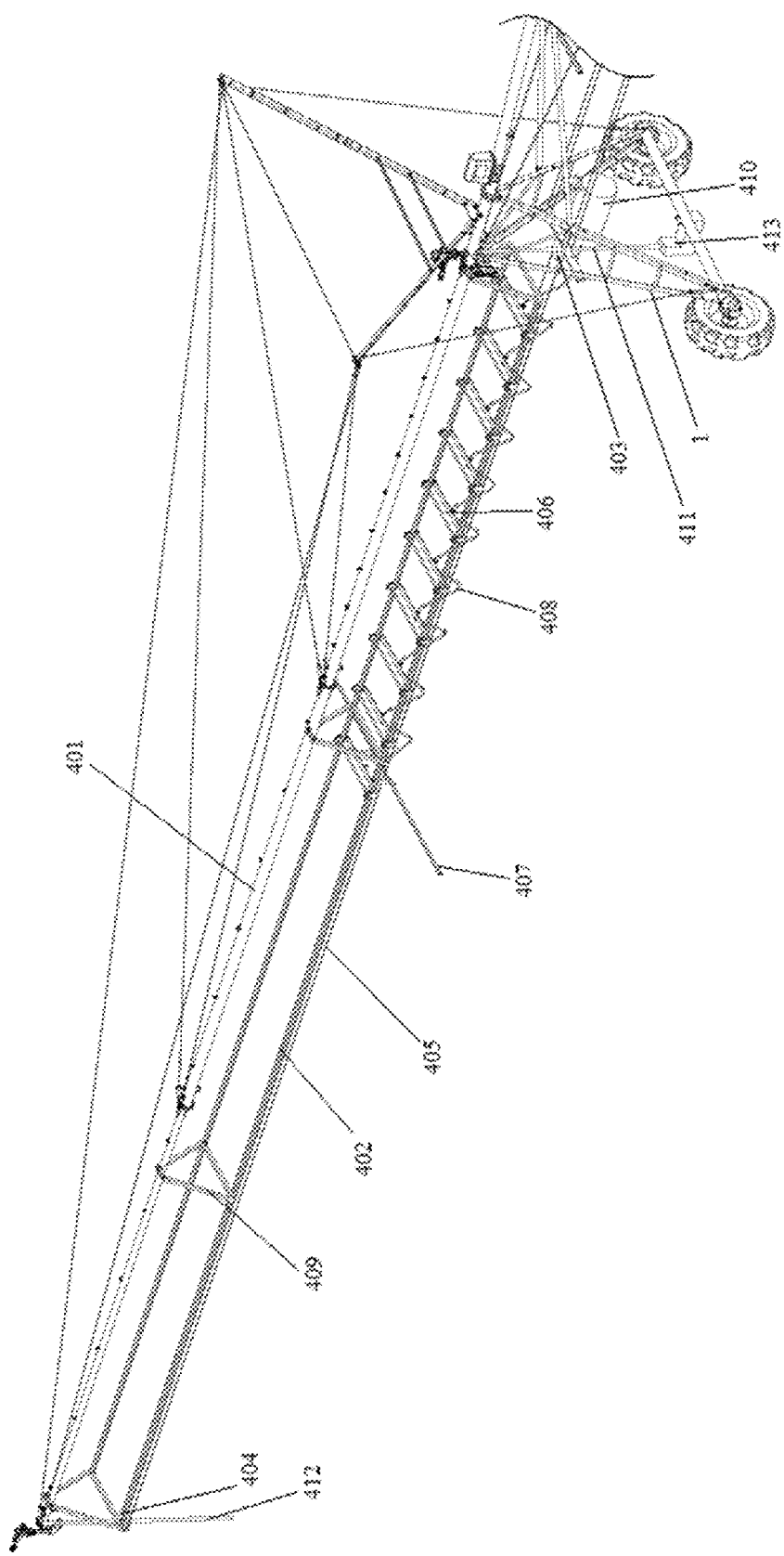
FIG. 7 is a structure diagram of a secondary application unit according to some examples of the present disclosure.
Figure 8:
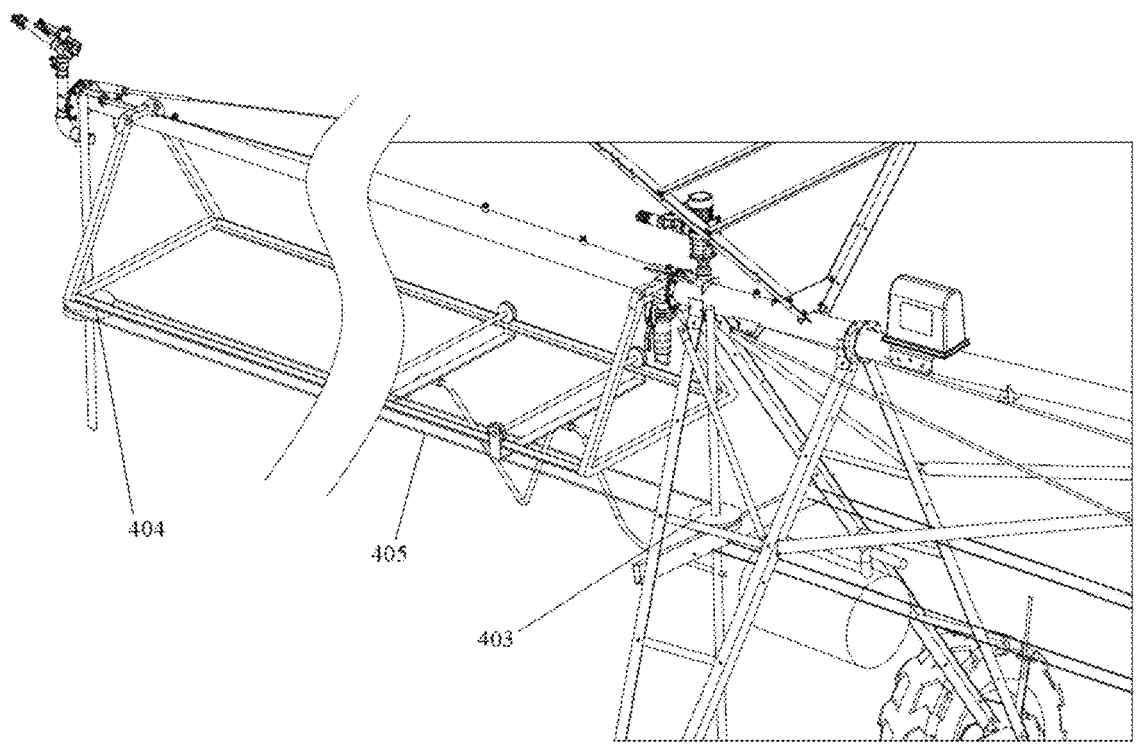
FIG. 8 is a partial enlarged view of a part of the secondary application unit shown in FIG. 7.

In particular, with reference to FIG. 7 and FIG. 8, the secondary application unit of the present disclosure may include an Overhang 401, a guide rail 402, a second driving wheel 403, a second driven wheel 404, a secondary cable 405, a sliding frame 406, a secondary application rod 407 and a secondary supply pipe 408. In order to show the structure of the second driving wheel 403, the second driven wheel 404 and the secondary cable 405 more clearly, the above three components are illustrated in a partial enlarged view in FIG. 8.

According to some examples of the present disclosure, the Overhang 401 is a main structure of the secondary application unit. One end of the Overhang 401 may be fixed on one side of the outmost tower 1 away from the span structure. Therefore, the whole body of the over hangs 401 may extend in an extension direction away from the span structure. As a whole, the Overhang 401 can be taken as an extension part of the span structure. The other end of the Overhang 401 may be fixed to the outmost tower 1 through a suspension cable.

According to some examples of the present disclosure, the guide rail 402 is disposed along the direction in which the Overhang 401 extends. The guide rail 402 is configured provide a moving path of the secondary application rod 407. The guide rail 402 can be fixed on the Overhang 401 via a number of secondary connecting brackets 409. A plurality of sliding frames 406 can be disposed on the guide rail 402. The plurality of sliding frames 406 may be sequentially arranged on the guide rail 402 and can slide along the guide rail 402.

According to some examples of the present disclosure, the secondary application rod 407 is provided on an outmost sliding frame, i.e., which is on the furthest end of the guide rail. A plurality of secondary spray heads may be distributed on the secondary application rod 407. Further, a secondary storage tank 410 may be provided on the outmost tower 1. In the secondary storage tank 410, agriculture chemicals or fertilizers can be stored. The secondary storage tank 410 may be connected to the secondary application rod 407 through the secondary supply pipe 408. In operations, agriculture chemicals or fertilizers stored in the secondary storage tank 410 can be conveyed to the secondary application rod 407 through the secondary supply pipe 408 and sprayed by the secondary spray heads on the secondary application rod 407 to realize secondary agriculture chemicals or fertilizers application. In this example, the secondary supply pipe 408 may be fixed on the plurality of sliding frames 406 in sequence. This kind of fixed connection allows the secondary supply pipe 408 to extend along the guild rail 402 without excessive sagging due to its own weight.

To realize the movement of the secondary application rod 407 along the guild rail 402, the second driving wheel 403, the second driven wheel 404 and the secondary cable 405 are provided. The second driving wheel 403 may be connected via a first secondary wheel shaft 411 to a secondary application motor 413 provided on the outmost tower 1. The second driven wheel 404 may be connected to the other end of the Overhang 401 through a second secondary wheel shaft 412. Further, the secondary cable 405 may be wound around the second driving wheel 403 and the second driven wheel 404 and is fixed on the outermost sliding frame 406.

In operations, the secondary application motor 413 may output power to drive the second driving wheel 403 to rotate through the first secondary wheel shaft 411 so that the secondary cable 405 can reciprocate between the second driving wheel 403 and the second driven wheel 404. Since the secondary cable 405 is fixed on the outermost sliding frame 406, when the secondary cable 405 moves, it will drive the outermost sliding frame 406 to move along the guild rail 402. During the movement of the outermost sliding frame 406 along the guide rail 402, agriculture chemicals or fertilizers stored in the secondary storage tank 410 can be conveyed to the secondary application rod 407 through the secondary supply pipe 408 and sprayed by the secondary spray heads on the secondary application rod 407 to realize agriculture chemicals application or fertilizer application in a range covered by the Overhang 401.

In some examples of the present disclosure, the placement of the secondary application rod 407 may be arbitrarily set according to implementation requirements. For example, the secondary application rod 407 may be set in a same direction with the extension of the Overhang 401 or may be set in a direction perpendicular to the extension of the Overhang 401, and etc.

In some examples of the present disclosure, the position of the second driving wheel 403 on the first secondary wheel shaft 411 can be adjusted. Correspondingly, the position of the second driven wheel 404 on the second secondary wheel shaft can be adjusted too. Therefore, different height requirements on the application can be achieved by adjusting any of the positions of the second driving wheel 403 and the second driven wheel 404 on their respective wheel shaft.

Figure 9:
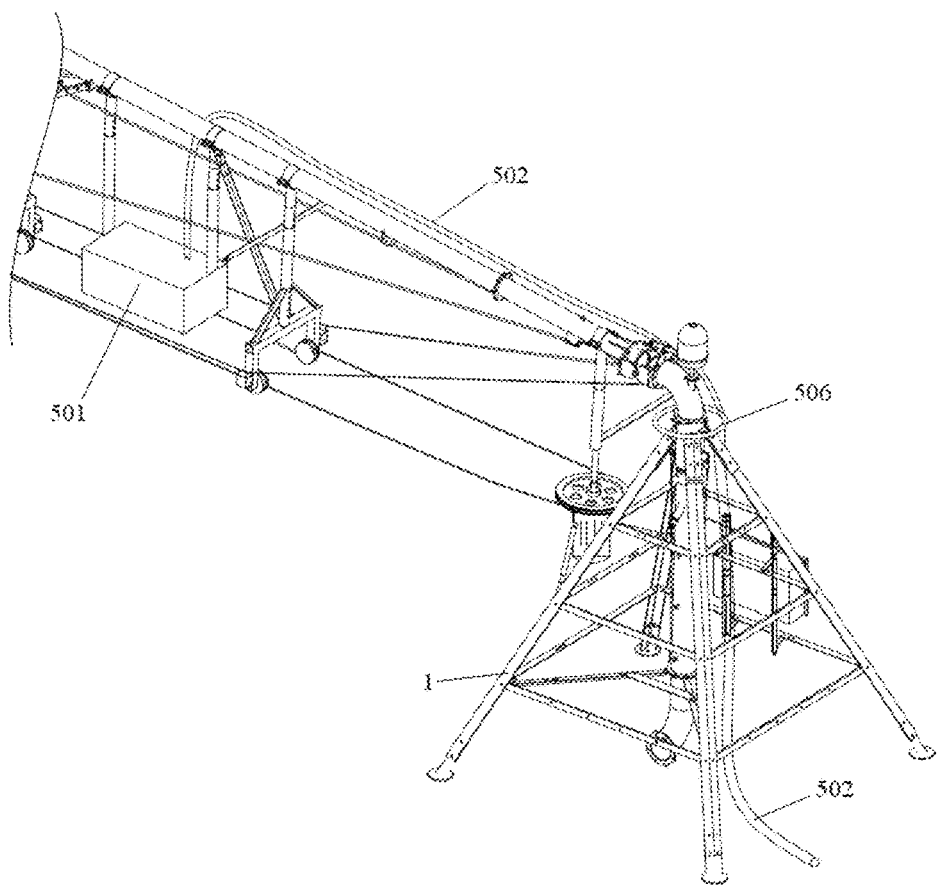
FIG. 9 is a structure diagram of a supply tank according to some examples of the present disclosure.
Figure 10:
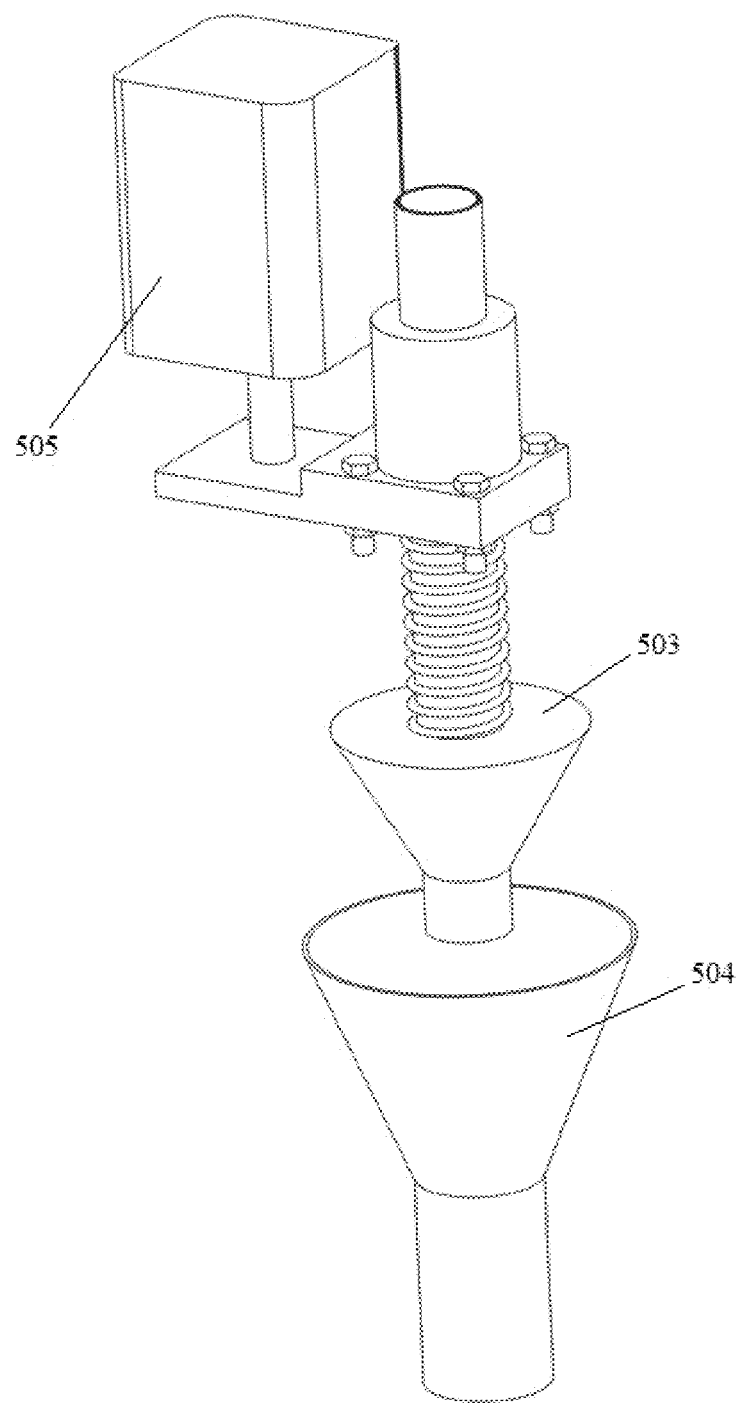
FIG. 10 is a structure diagram of a supply outlet and a supply inlet according to some examples of the present disclosure.

As an alternative example, with reference to FIG. 9 and FIG. 10, a supply tank 501 may further be provided on the span structure 2. The supply tank 501 may be connected to the span structure 2 by a detachable connector. Wherein, the detachable connector may be a connection arm, a connection claw, or the like. The supply tank 501 may be connected to an adjacent tower 1 or any tower on the whole irrigation system and then further to an external supply system via a supply pipe 502. The supply tank 501 may obtain agriculture chemicals or fertilizer for storage through the supply pipe 502. The supply tank 501 may also be connected to a supply outlet 503. After agriculture chemicals or fertilizers are conveyed into the supply tank 501 through the supply pipe 502, the agriculture chemicals or the fertilizers stored in the supply 501 can be output through the supply outlet 503. When the application unit moves near the supply tank 501 along the span structure, the supply outlet 503 of the supply tank 501 can be connected with a supply inlet 504 on the storage tank of the application unit. Therefore, agriculture chemicals or the fertilizers stored in the supply tank 501 may be filled into the storage tank of the application unit.

In some examples of the present disclosure, a supply device 505 may further be provided on the supply tank 501. The supply device 505 can be an air cylinder, a hydraulic cylinder or the like. An output end of the supply device 505 may be connected with the supply outlet 503. When the supply device 505 works, the supply outlet 503 can be driven to move linearly through stretching and retracting of the output end of the supply device 505. In some examples of the present disclosure, the supply inlet 504 may adopt a flared shape. The supply outlet 503 may adopt a conical shape. Therefore, the supply outlet 503 can be well matched with the supply inlet 504.

During the process of refilling agriculture chemicals or the fertilizers, the movable platform is first moved to a position of the supply tank 501 by the transport assembly. In this position, the supply inlet 504 on the movable platform would be relative to the supply outlet 503 of the supply tank 501. Then, the supply device 505 works. During this process, the output end of the supply device 505 may extend out driving the supply outlet 503 to move gradually close to the supply inlet 504 and finally connect with the supply inlet 504. At this moment, the storage tank can connect with the supply tank 501 through the supply outlet 503. At last, agriculture chemicals or fertilizers in the supply tank 501 can be filled into the storage tank through the supply outlet 503 and the supply inlet 504. Therefore, the storage tank can be replenished with agriculture chemicals or fertilizers.

In some examples of the present disclosure, the irrigation system can be a center pivot irrigation system. In this example, the span structure can rotate around the pivot center. Accordingly, referring to FIG. 9, a ring-shaped transit storage tank 506 can be provided at a position where the span structure 2 rotatably connects the tower 1. The transit storage tank 506 may include an annular cavity. The transit storage tank 506 may be connected with the supply box through a supply pipe. The annular surface of the transit storage tank 506 facing the span structure is connected with other parts of the transit storage tank 506. The annular surface can rotate by taking the center of the circle of the transit storage tank 506 as a rotation center. In order to ensure hermetic seal of the transit storage tank 506, self-adaptive sealing rubber can be arranged between the annular surface and other parts of the transit storage tank 506. Moreover, the annular surface may be provided with an outlet. The outlet may be connected with the supply tank 501 through the supply pipe 502.

During operations, the span structure may rotate continuously taking the central point as a rotation center. The supply pipe 502 between the supply tank 501 and the transit storage tank 506 may drive the annular surface to rotate correspondingly. In the above examples, winding of the supply pipe 502 while rotating with the span structure would be well avoided.

Figure 11:
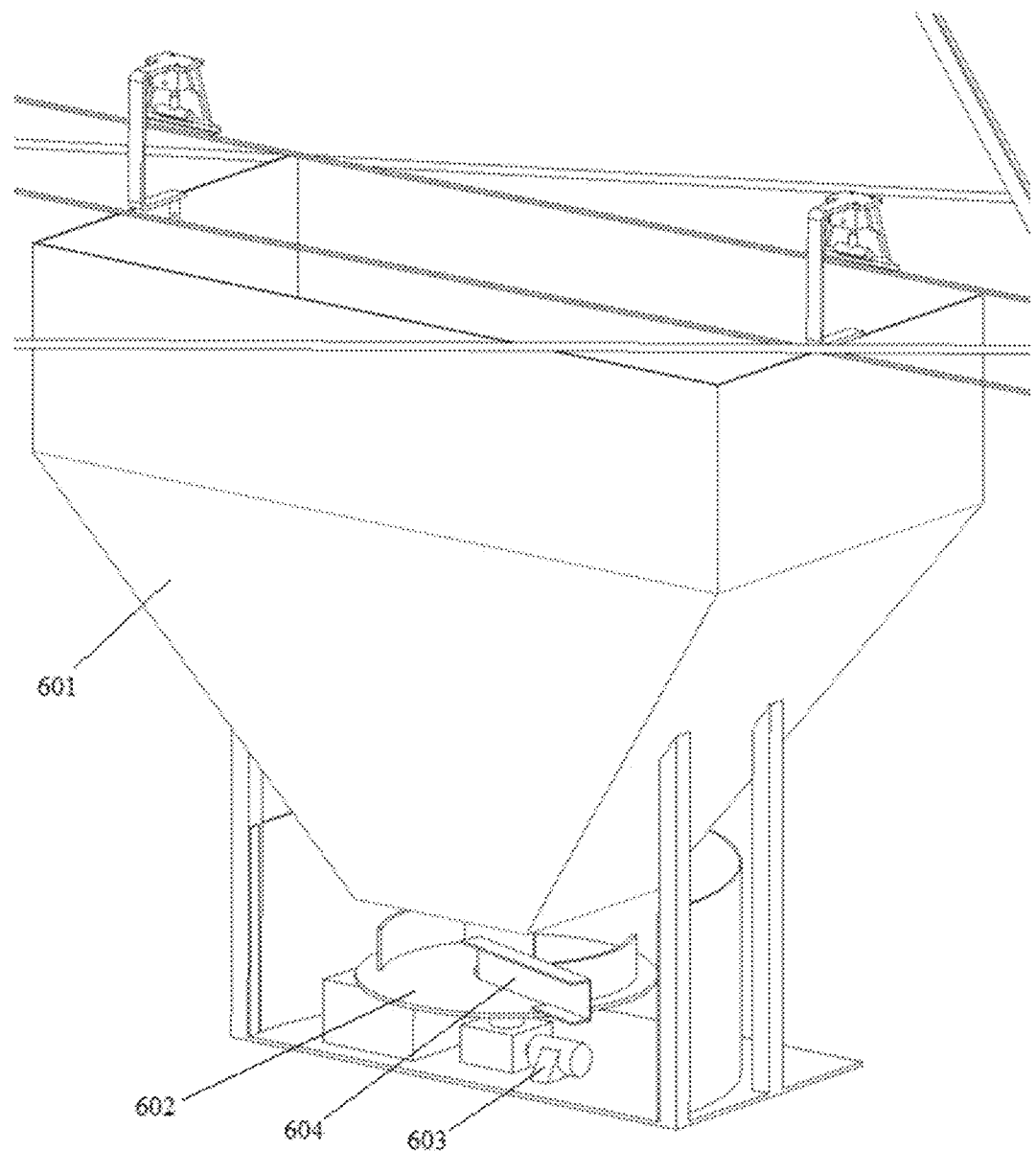
FIG. 11 is a structure diagram of a seeding-fertilizer spreader unit according to some examples of the present disclosure.

As an alternative example, with reference to FIG. 11, the seeding-fertilizer spreader unit may include a storage box 601, a spreading disc 602 and a seeding-fertilizer spreader motor 603. Wherein, the storage box 601 may be configured to store seeds or fertilizer. Specifically, it may have a funnel shape and may be provided with an outlet for outputting seeds or fertilizer at a lower end thereof. The spreading disc 602 may be located below the storage box 601 and be opposite to the outlet. Further, the spreading disc 602 may be provided with a plurality of spreading vanes 604 for defining a seed or fertilizer spread direction. The spreading disc 602 may also be connected to the seeding-fertilizer spreader motor 603.

In operations, the outlet at the bottom of the storage box 601 may be opened. Then seeds or fertilizers stored in the seed storage box 601 may come out from the outlet and fall onto the spreading disc 602 under the influence of gravity. At the same time, the seeding-fertilizer spreader motor 603 may operate to drive the spreading disc 602 to rotate around its rotation center. The seeds or fertilizers falling on the spreading disc 602 may rotate along with the spreading disc 602. And the seeds or fertilizer may fly out from the edge of the spreading disc 602 under the influence of centrifugal force. In this way, seeding-fertilizer spreader can be realized. The spreading vanes 604 on the spreading disc 602 may define the direction in which the seeds or fertilizer fly out. Here, the number of the spreading vanes 604 and specific distribution patterns of the spreading vanes 604 can be set according to seeding-fertilizer spreader requirements. In addition, the range of seeding-fertilizer spreader may be controlled by controlling the spreader motor 603 to control the rotation speed of the spreading disc 602. When the rotation speed of the spreading disc 602 is high, the centrifugal force to which the seeds or fertilizer are subjected is large and thus the distance of flight is long. Or otherwise, the distance of flight is short.

As an alternative example, the monitoring unit may include at least one of an image acquisition device, a temperature sensor, a humidity sensor, a crop growth sensor, a pest condition and disease monitoring sensor. According to some examples of the present disclosure, the image acquisition device may be configured to acquire graphic data of crops, monitor and analyze growth, health states and the like of the crops. Based on different data acquisition requirements, the image acquisition device can select an infrared image acquisition device, a spectral imaging device or the like. According to some examples of the present disclosure, the temperature sensor may be configured to monitor temperature of crop growth environment. The humidity sensor may be configured to monitor humidity of the crop growth environment. Therefore, the crop growth environment can be monitored and analyzed.

Figure 12:
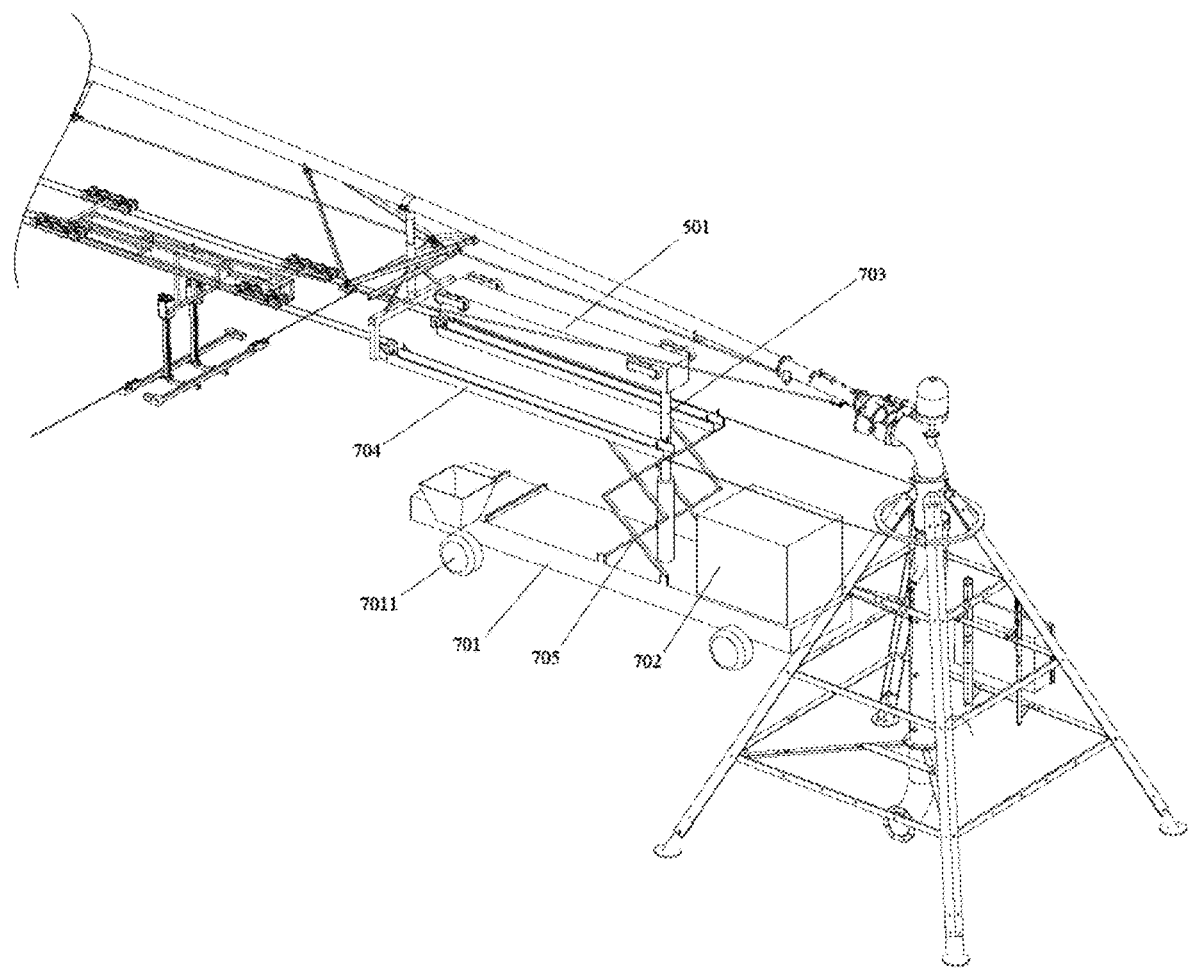
FIG. 12 is a structure diagram of a transportation assembly part for movable platform load or unload from the transportation assembly to the transport assembly according to some examples of the present disclosure.

As an alternative example, the plant protection and management system may further include a transportation assembly. The transportation assembly may be configured to load or unload the supply tank 501 in the above examples and can load or unload the movable platform and transfer it from one irrigation system to another. Specifically, referring to FIG. 12, the transportation assembly may include a transport trolley 701, a liquid storage tank 702, a first lifting assembly 703 and a rail 704.

In some examples of the present disclosure, the configuration and structure of the supply tank 501 can be the same as described and shown in FIG. 9. In some examples of the present disclosure, the supply tank 501 may be disposed on the movable platform and can move with the movable platform. In some examples of the present disclosure, the transportation assembly may employ the implementation of the second supporting cable and the second roller set as described. Accordingly, the supply tank 501 may be located at an end position of the second supporting cable. When agriculture chemicals or fertilizers carried by the movable platform are insufficient, the supply tank 501 may be used to supply the agriculture chemicals or fertilizers.

The transport trolley 701 may be a main part of the transportation assembly. The transport trolley 701 may be provided with wheels 7011 and may be driven to move by the wheels 7011. Further, the wheels 7011 may be provided with hydraulic jacks. Since the terrain in a field cannot be kept flat in most cases, the position of the wheels 7011 with respect to the transport trolley 701 can be adjusted by the hydraulic jacks provided on the wheels 7011, thereby the transport trolley 701 can keep in a horizontal state to facilitate the connection of the supply tank 501 and the movable platform.

In some examples of the present disclosure, the transport trolley 701 may be provided with a storage tank 702. The storage tank 702 may be configured to store or prepare agriculture chemicals/fertilizer solutions to be supplied to the supply tank 501. The tank 702 may be connected to the supply tank 501 through a supply pipeline. The volume of the storage tank 702 may be set according to implementation requirements. However, regardless of its size, the storage tank 702 may have the functions of air exhaust, liquid level monitoring, anti-flocculation stirring, emptying, flushing and the like. In addition, the transport trolley 701 may be provided with a liquid preparation system. The liquid preparation system may be a device for proportioning and diluting concentrated liquids according to formulas of agriculture chemicals or fertilizers. After the preparation of the liquid agriculture chemicals/fertilizer is completed, the liquid may be filled in the storage tank 702, and then be pumped into the supply tank 501 from the storage tank 702. At last, the supply tank 501 may be used to supply agriculture chemicals or fertilizers for the movable platform.

The first lifting assembly 703 may be configured to drive the supply tank 501 to lift. Specifically, the first lifting assembly 703 can drive the supply tank 501 to ascend to the vicinity of the span structure. Then the supply tank 501 may be fixed on the span structure through a detachable connector. Then, an operation of fluid infusion for the supply tank 501 can be performed. After the operation of fluid infusion is completed, the first lifting assembly 703 can drive the supply tank 501 to descend and return to the transport trolley 701. Then, the supply tank 501 can be transferred to a next working position along with the transport trolley 701. In particular, the first lifting assembly 703 may be selected according to implementation requirements, such as lift pins, lifters, and etc.

The rail 704 may be arranged on the transport trolley 701 via a second lifting assembly 705. The position of the rail 704 can be adjusted by the second lifting assembly 705. The second lifting assembly 705 may be selected from cross telescoping rods, hydraulics, and etc. according to the implementation requirements. The rail 704 can be butted with the end point of the second supporting cable. Therefore, the movable platform can move onto the rail 704 after the operation is finished. The position of the rail 704 can be adjusted by the second lifting assembly 705 so as to facilitate moving in and out of the movable platform under different terrain conditions. A fixing assembly can also be arranged on the rail 704. The relative position of the movable platform and the rail 704 can be locked through the fixing assembly. In this case, sliding of the movable platform caused by bumping during transportation can be prevented. Furthermore, a linear displacement assembly for adjusting the position of the rail 704 can be arranged between the second lifting assembly 705 and the transport trolley 701. Through the linear displacement assembly, the position of the rail 704 can be adjusted in different directions. In this way, the rail 704 can be conveniently butted with the second supporting cable.

In addition, the movable platform can be carried by the transport trolley 701 and moved to any working position along with the transport trolley 701. Accordingly, the transport trolley 701 may be further provided with a fixing assembly for fixing the movable platform. Through the fixing assembly, the movable platform can be firmly fixed on the transport trolley 701, so that the movable platform cannot move relative to the transport trolley 701 while carried by the transport trolley 701. In this case, any damage of the movable platform can be prevented.

Figure 13:
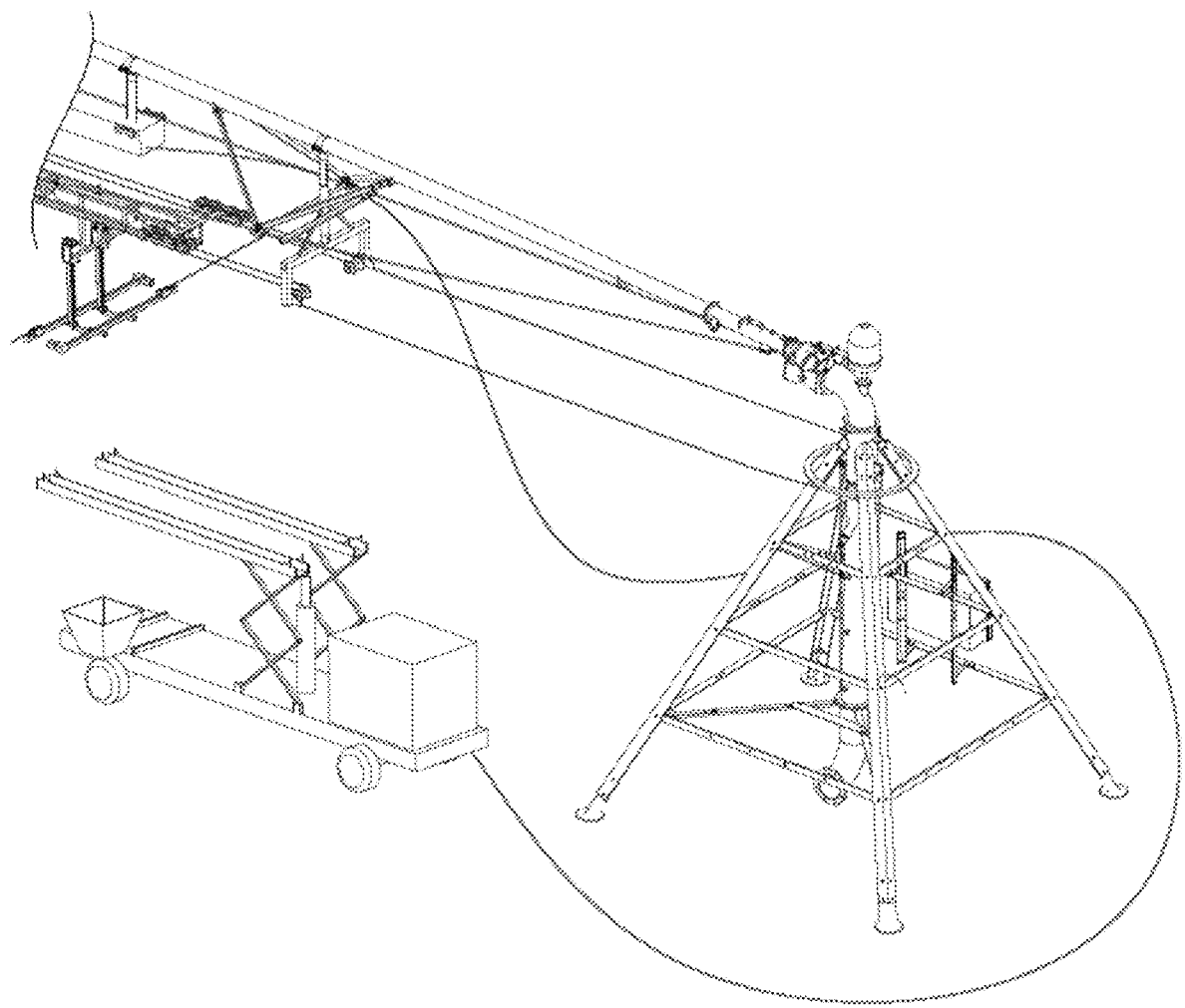
FIG. 13 is a schematic diagram illustrating the position of a transportation assembly as applied to a center pivot irrigation system according to some examples of the present disclosure.
Figure 14:
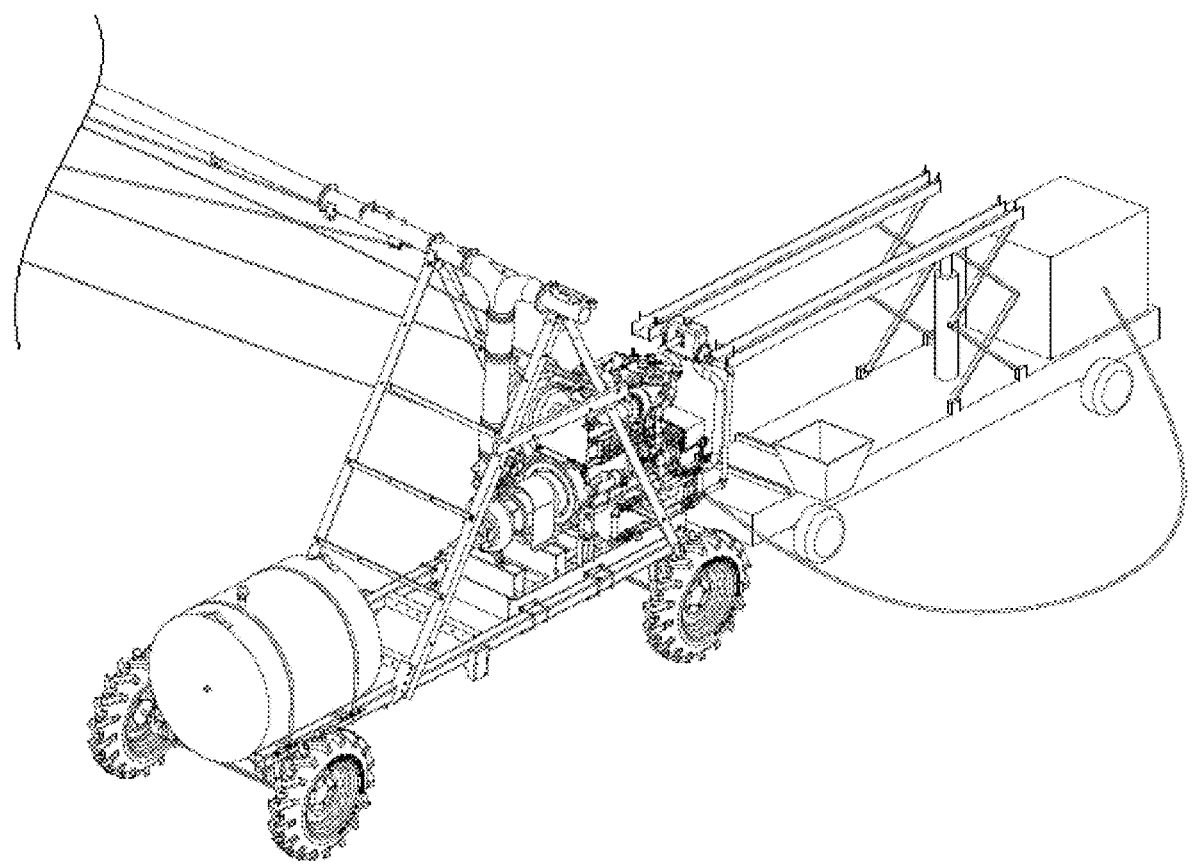
FIG. 14 is a schematic diagram illustrating the position of a transportation assembly as applied to a linear irrigation system according to some examples of the present disclosure.

In addition, parking positions of the transport trolley 701 are different when operating on different kinds of irrigation systems. However, the basic function of the transport trolley is both to supply agriculture chemicals or fertilizers to the movable platform. Referring to FIG. 13, when applied to a center pivot irrigation system, the transport trolley 701 needs only to park near the center point and be connected to the supply tank 501 through a supply pipe. Referring to FIG. 14, when applied to a linear irrigation system, the transport trolley 701 needs to be hooked in the direction of a center cart of the linear irrigation system and move together with the center cart.

Figure 15:
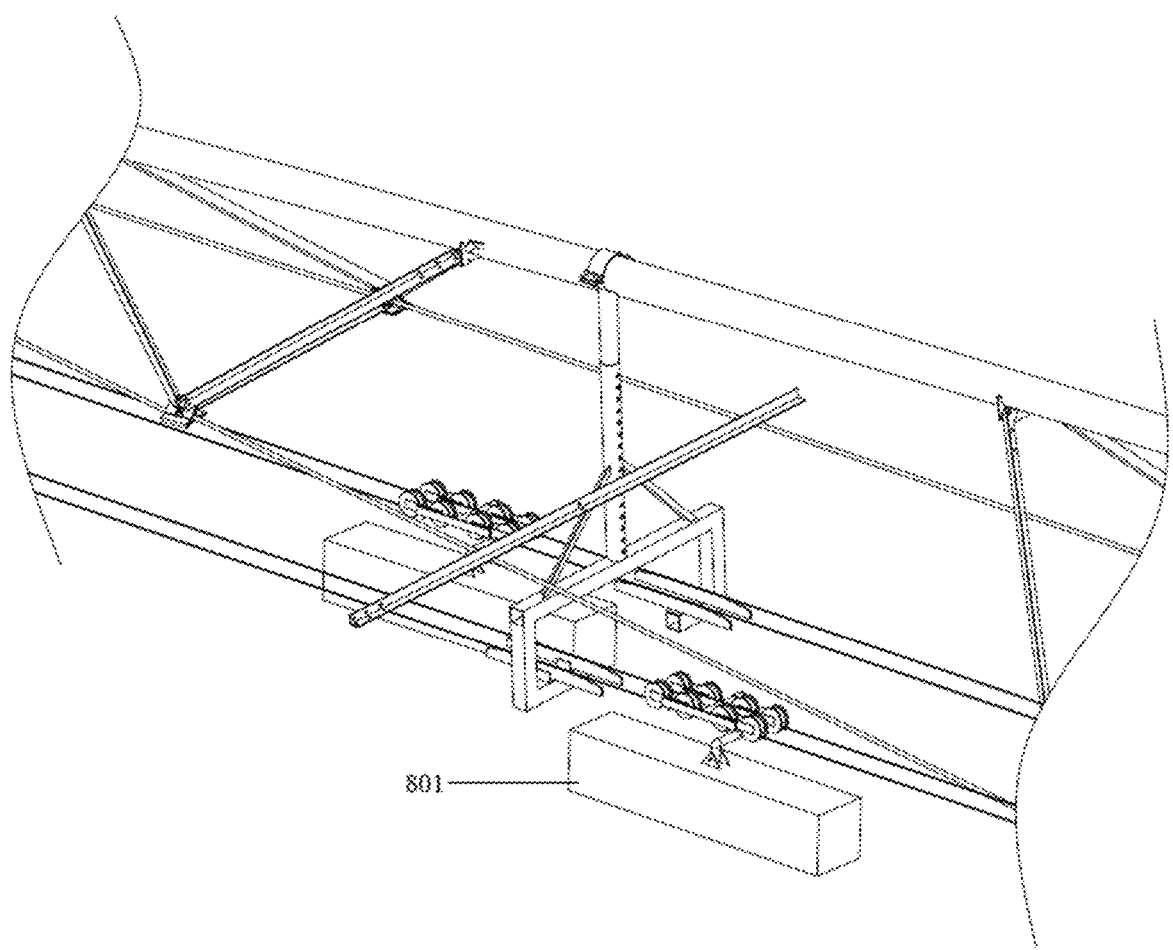
FIG. 15 is a structure diagram of a moveable trolley according to some examples of the present disclosure.

As an alternative example, referring to FIG. 15, the plant protection and management system of the present disclosure may further include a material transport unit 801. The material transport unit 801 is capable of loading and containing articles, materials and the like required in the plant working process. Further, the material transport unit 801 can move along the span structure through the transport assembly so as to transport the articles, materials and the like to different positions. The material transport unit 801 may be an open platform, a frame, or a closed structure with an internal cavity, or the mobile platform may be slightly modified. Referring to FIG. 15, the material transport unit 801 can be connected to the second supporting cable through a third roller set while the second supporting cable is used. The number of the third roller sets and the number of rollers included in a third roller set can be referred to the arrangement of the second roller sets in the foregoing examples and will not be described in detail. In practical applications, according to different arrangements (number and distribution) of the second supporting cables, a plurality of material transport units 801 can be arranged on the different second supporting cables. The plurality of material transport units 801 can run in a same direction or in opposite directions or can run simultaneously, so that a higher transport efficiency can be realized.

Figure 16:
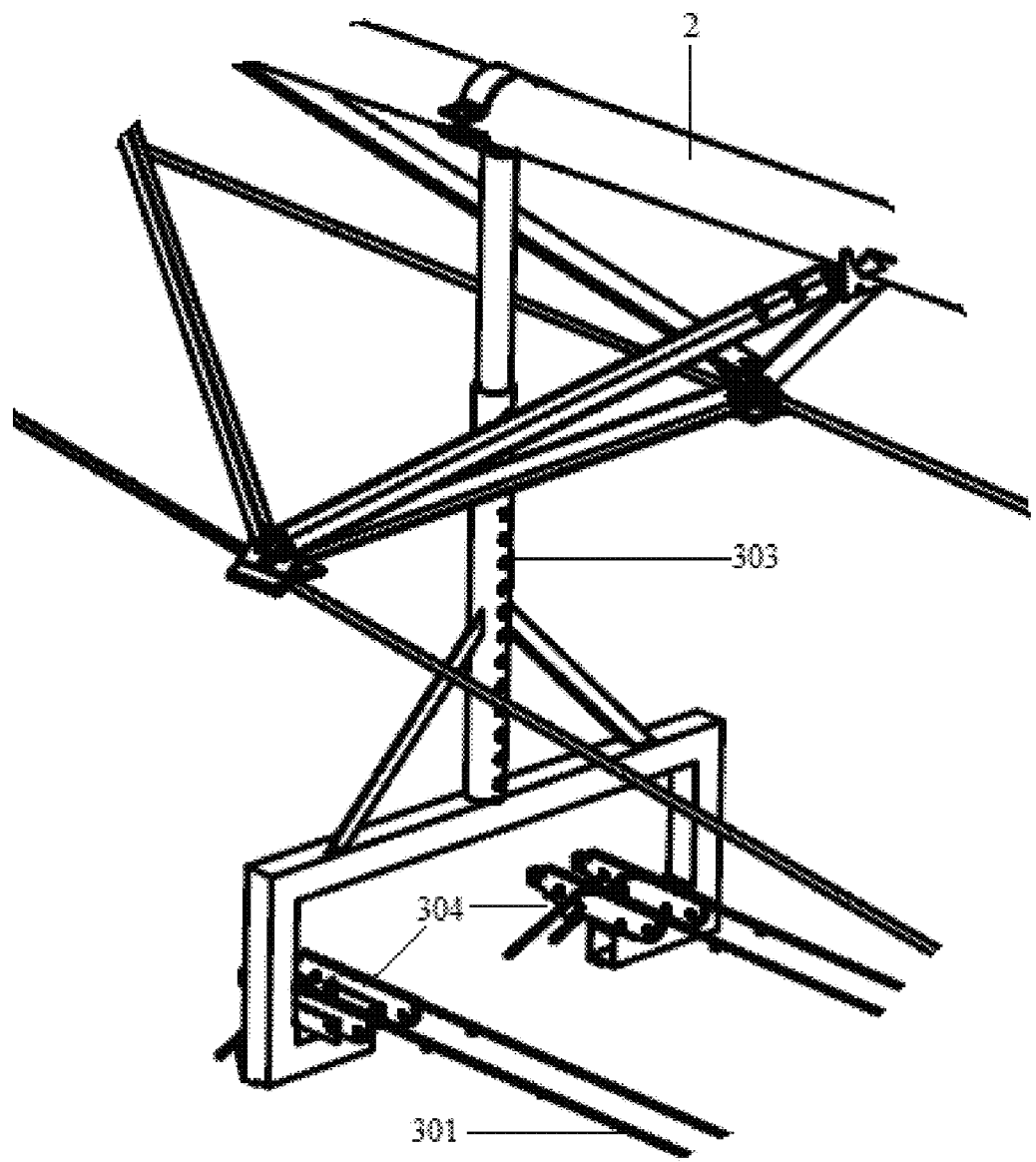
FIG. 16 is a structure diagram of a partial enlarge view of transport assembly terminal frame according to some examples of the present disclosure.

As an alternative example, referring to FIG. 16, the transport assembly shown in FIG. 5 may further include an end fixing frame 303. The end fixing frame 303 may be fixed on to the span structure 2 and is configured to fix the end of the second supporting cable 301. Specifically, the end fixing frame 303 can be provided with a guide groove 304 to which the end of the second supporting cable 301 is connected.

During operations, the movable platform can move or be moved to a position corresponding to the end fixing frame 303 under the span structure 2. After being lifted and aligned, the movable platform can enter the guide groove 304 through the second roller set, further enters the second supporting cable 301 as carried and guided by the guide groove 304, and further moves along the second supporting cable 301. When the movable platform needs to be removed to another place, maintained or the like, the movable platform can be moved to the end fixing frame 303 along the second supporting cable 301 and depart the second supporting cable 301 through the guide groove 304. The whole process is quick and easy to operate, therefore, has a high practical value.

Figure 17:
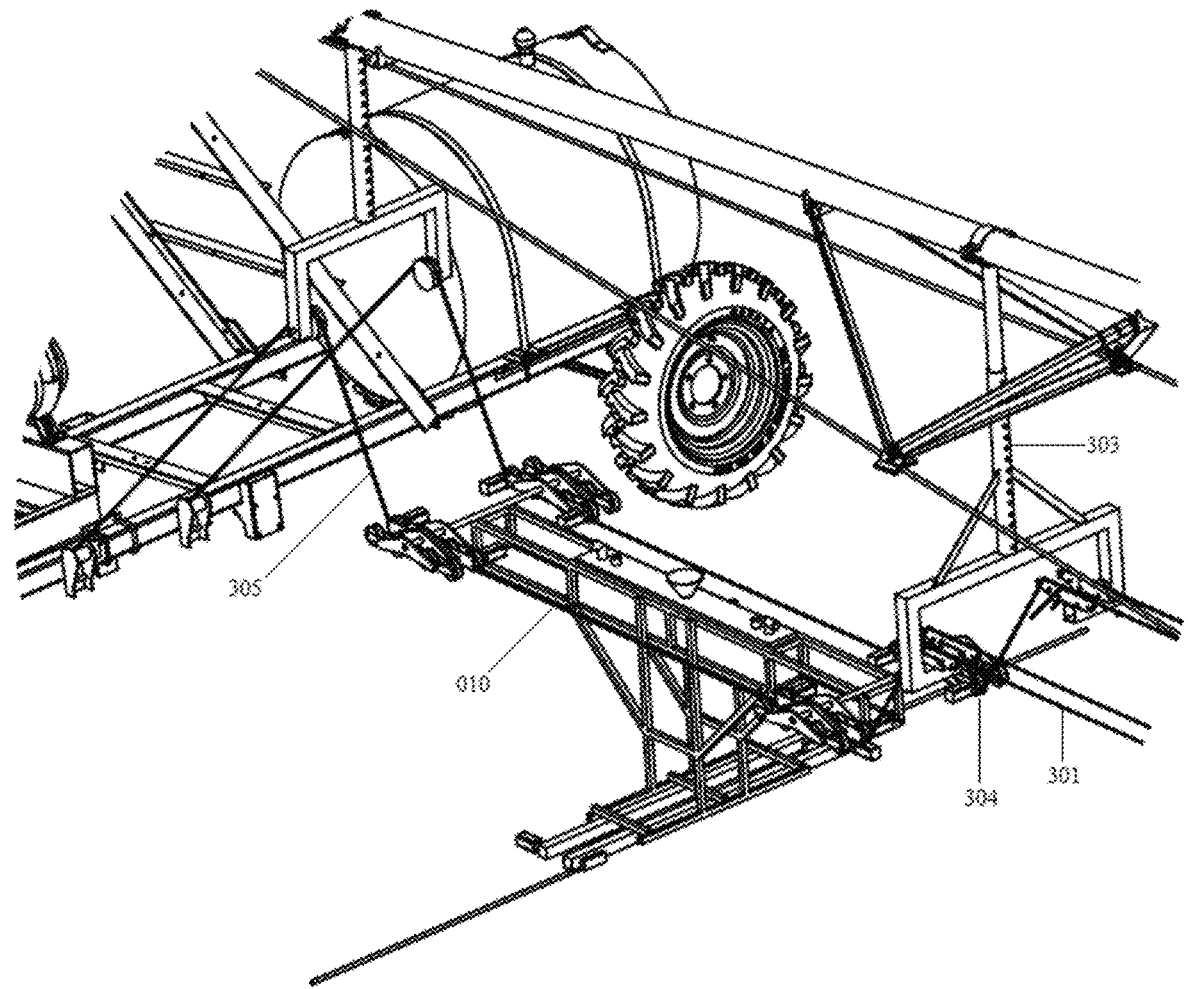
FIG. 17 is a structure diagram of a lifting cable to load or unload the movable platform from the transportation assembly according to some examples of the present disclosure.

As an alternative example, referring to FIG. 17, the transport assembly may further include a lifting cable 305, arranged at the tower 1 at an end position. The lifting cable 305 is connected with the movable platform 010. The lifting cable 305 may be connected with a winding and unwinding device. The winding and unwinding action of the lifting cable 305 can be realized through the winding and unwinding device. Therefore, the movable platform 010 can be driven to ascend and descend through the lifting cable 305. Further, the movable platform 010 may enter the second supporting cable 301 through the guide groove 304 as the lifting wire rope 305 moves the movable platform 010 up to the position of the end fixing frame 303. The lifting cable 305 is flexible, and the guide groove 304 is matched with the lifting cable 305 to have a certain width, so that when controlling the movable platform 010 ascending and entering the second supporting cable 301 through the guide groove 304, the action can be realized without strictly aligning with the position of the second supporting cable 301.

Figure 18:
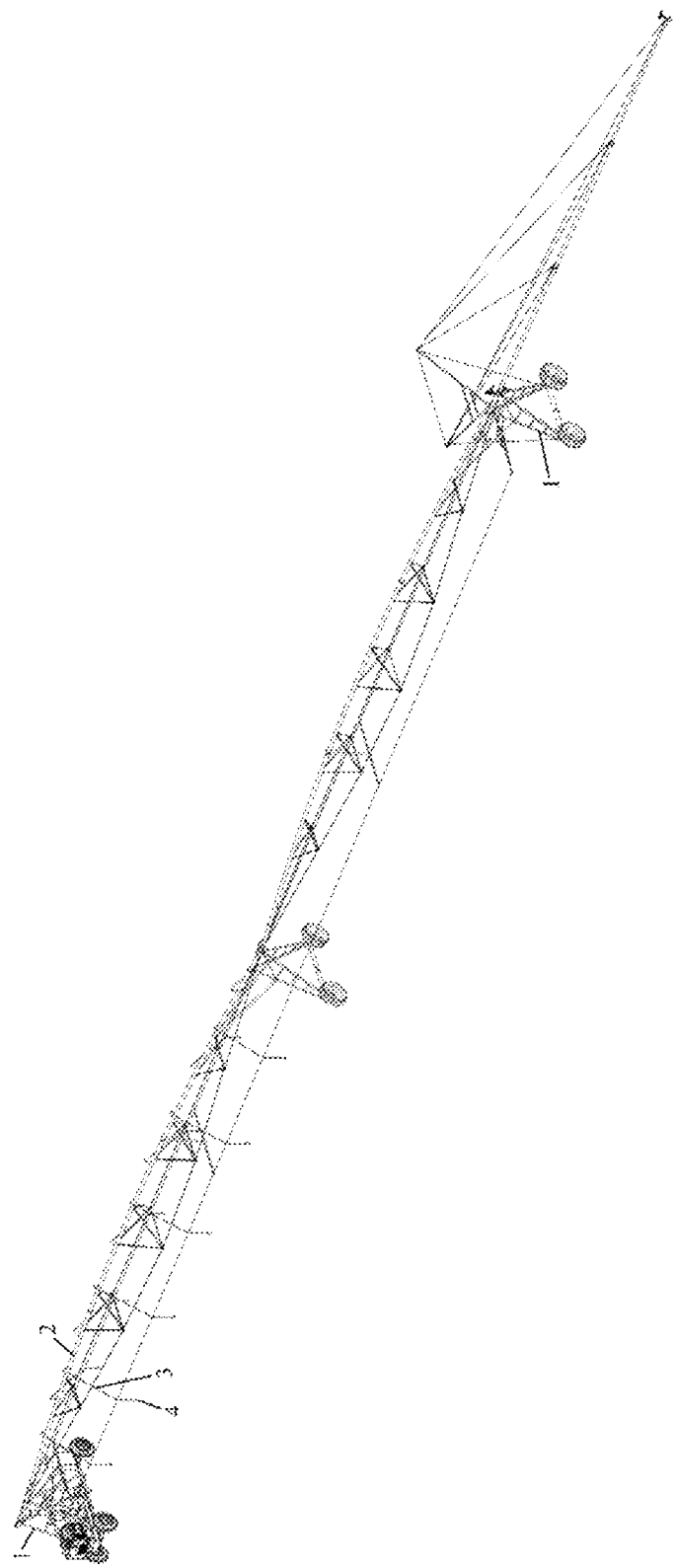
FIG. 18 is a structure diagram of Linear irrigation system according to some examples of the present disclosure.

As an alternative example, referring to FIG. 18, the plant protection and management system may include at least two towers 1 sequentially arranged at intervals, and a span structure 2 which spans between the at least two towers 1. Further, a plurality of irrigation hoses 3 are arranged at intervals on the span structure 2. Further, a sprinkler 4 is provided at an end of each irrigation spray hose 3.

Figure 19:
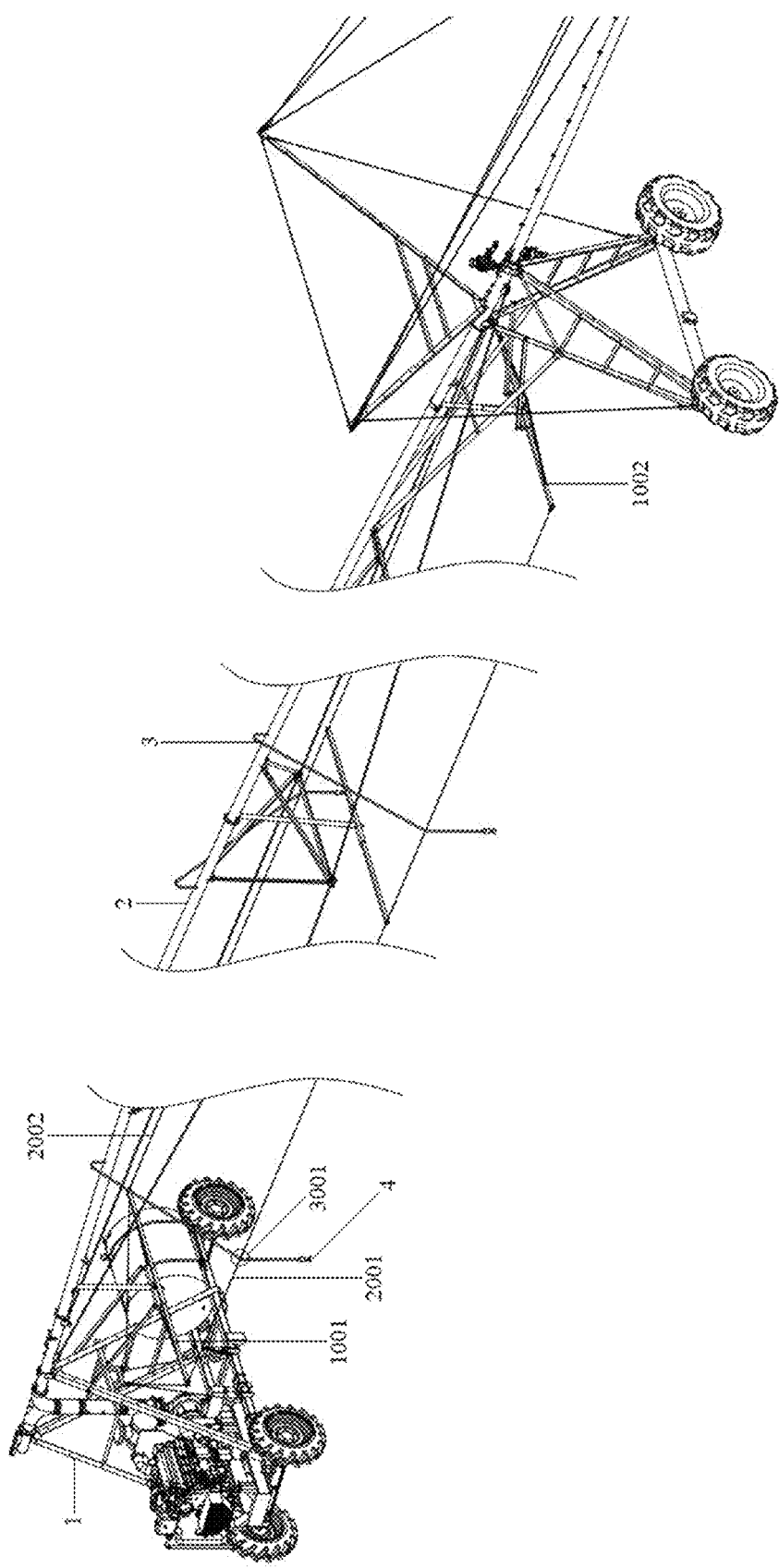
FIG. 19 is a structure diagram of center pivot irrigation system sprinkler height adjustment device according to some examples of the present disclosure.

According to FIG. 19, the center pivot and linear irrigation system sprinkler height adjustment device may include: a first driving rod 1001, a first driven rod 1002, a first adjusting cable 2001, a second adjusting cable 2002 and irrigation hose sliding sleeves 3001.

In examples of the present disclosure, the first driving rod 1001 connects to a first tower of the at least two towers 1. The first driven rod 1002 connects to a second tower of the at least two towers 1. The first adjusting cable 2001 connects a first end of the first driving rod 1001 and a first end of the first driven rod 1002. The second adjusting cable 2002 connects a second end of the first driving rod 1001 and a second end of the first driven rod 1002.

A plurality of irrigation hose sliding sleeves 3001 are arranged at intervals on the first adjusting cable 2001 and the second adjusting cable 2002. Each of the irrigation hoses may slide through an irrigation hose sliding sleeve 3001, and an end of the sprinkler 4 may hang down naturally.

When the first driving rod 1001 is driven to rotate, the shape of a closed structure surrounded by the first driving rod 1001, the first driven rod 1002, the first adjusting cable 2001 and the second adjusting cable 2002 would be changed, so that a relative distance between the first adjusting cable 2001 and the second adjusting cable 2002 would be changed accordingly. Thereby, the heights of the sprinklers 4 may be adjusted.

Figure 20A:
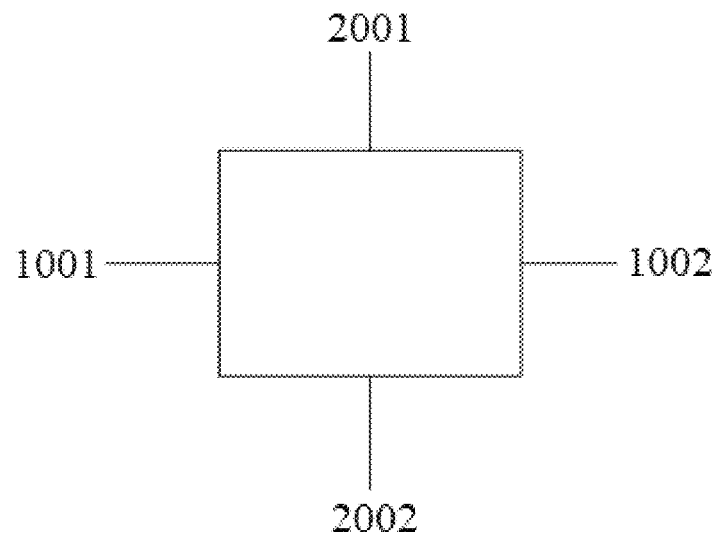
FIG. 20a is a structure diagram of sprinkler height adjustment device in a state according to some examples of the present disclosure.
Figure 20B:
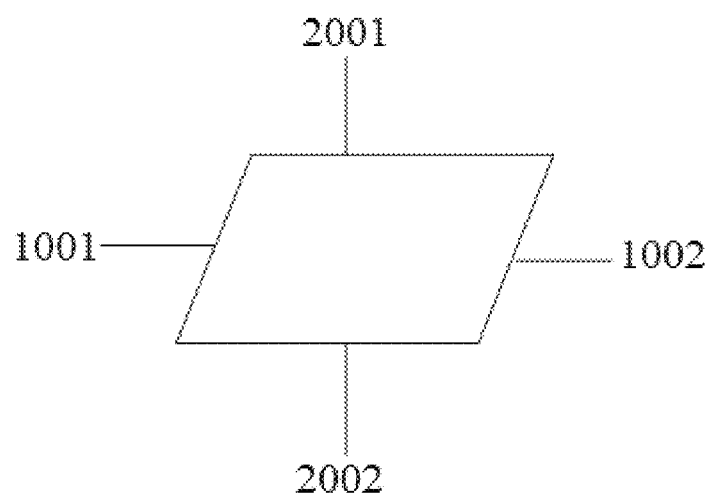
FIG. 20b is a structure diagram of sprinkler height adjustment device in another state according to some examples of the present disclosure.

Specifically, in operations, it can be seen from FIG. 20*a* and FIG. 20*b* that when the first driving rod 1001 rotates, the first driven rod 1002 may rotate therewith. In this process, the shape of the closed structure surrounded by the first adjusting cable 2001 and the second adjusting cable 2002 then may change from a rectangle to a parallelogram, and the distance between the first adjusting cable 2001 and the second adjusting cable 2002 may be shortened. When the first driving rod 1001 rotates in a reverse direction, the shape of the closed structure surrounded by the first adjusting cable 2001 and the second adjusting cable 2002 then may change from a parallelogram to a rectangle. In this process, the distance between the first adjusting cable 2001 and the second adjusting cable 2002 may increase. It can be seen that by merely adjusting the angle of the first driving rod 1001, the distance between the first adjusting cable 2001 and the second adjusting cable 2002 can be changed. Then the heights of the sprinklers 4 would be adjusted and the adjustment process is quite easy.

Figure 21A:
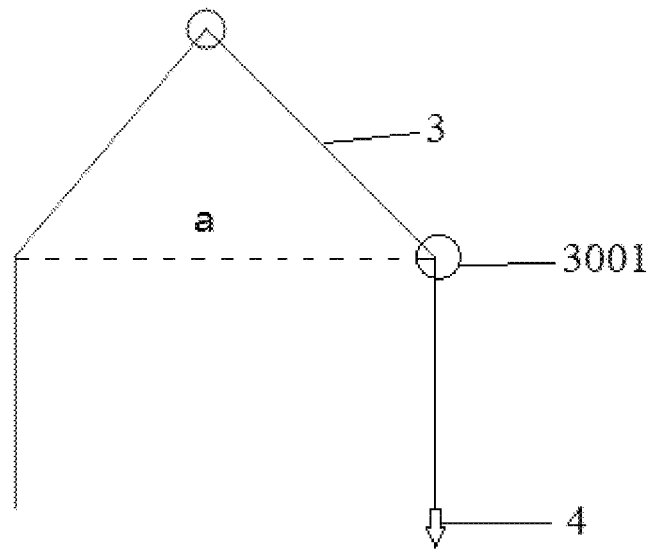
FIG. 21a is a structure diagram of sprinkler hoses in a state according to some examples of the present disclosure.
Figure 21B:
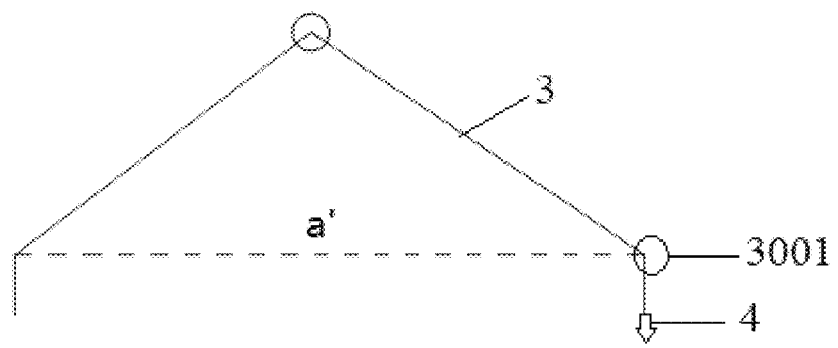
FIG. 21b is a structure diagram of sprinkler hoses in another state according to some examples of the present disclosure.

Based on the above structure, assuming that the distance between the first adjusting cable 2001 and the second adjusting cable 2002 is a. It can be seen from FIG. 21*a* that when the first driving rod 1001 rotates, the distance a would become smaller. Under the condition that the lengths of the irrigation hoses 3 are unchanged, the irrigation hoses 3 passing through the irrigation hose sliding sleeves 3001 may move downwards. That is, the heights of the sprinklers 4 may decrease. As shown in FIG. 21*b* that when the first active rod 1001 rotates in the reverse direction, the distance a' may increase. Under the condition that the lengths of the irrigation hoses 3 are unchanged, the irrigation hoses 3 passing through the irrigation hose sliding sleeves 3001 may move upwards, and then the heights of the sprinklers 4 may increase.

It can be understood that the shorter the distance between the first adjusting cable 2001 and the second adjusting cable 2002 is, the lower the heights of the sprinklers 4 are. In contrast, the farther the distance between the first adjusting cable 2001 and the second adjusting cable 2002 is, the higher the heights of the sprinklers 4 are. Since different crops require different spray irrigation heights, the heights of the sprinklers 4 can be adjusted by adjusting the rotation angle of the first driving rod 1001 manually.

As stated above, since the lengths of the irrigation hoses 3 are fixed, the heights of the sprinklers 4 from the ground can be adjusted by adjusting the distance between the first adjusting cable 2001 and the second adjusting cable 2002 at the two sides of the span structure. That is, by adjusting the rotation angle of the first driving rod 1001 manually, the heights of the sprinklers 4 can be adjusted.

Figure 22:
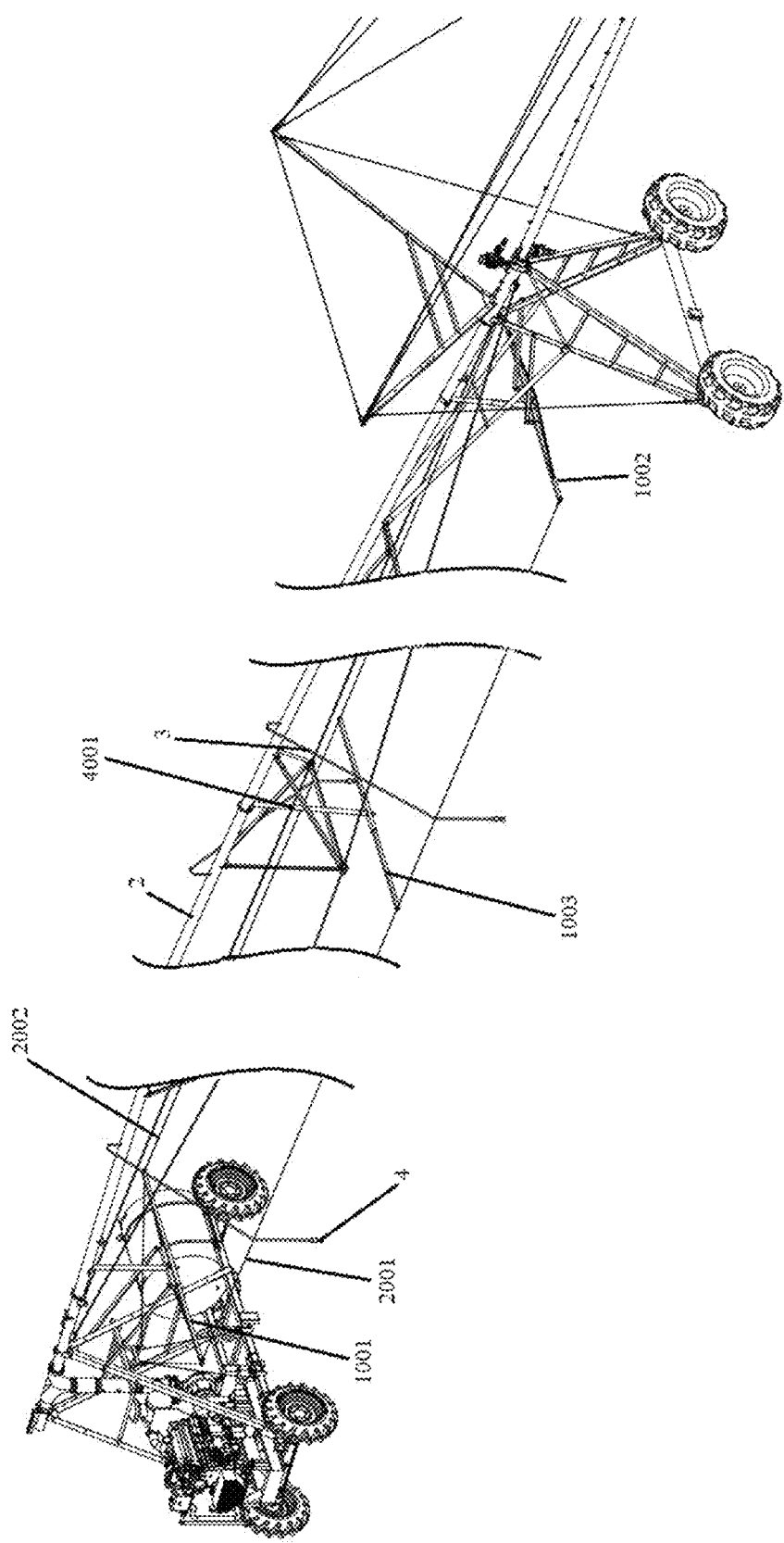
FIG. 22 is another schematic diagram illustrating another structure of a linear irrigation system sprinkler height adjustment device according to another example of the present disclosure.

FIG. 22 is another schematic diagram illustrating another structure of a center pivot and linear irrigation system sprinkler height adjustment device according to another example of the present disclosure. As shown in FIG. 22, the center pivot and linear irrigation system sprinkler height adjustment device may further include a plurality of longitudinal connecting assemblies 4001 arranged at intervals on the span structure 2. The center pivot and linear irrigation system sprinkler height adjustment device may further include a plurality of second driven rods 1003, each of which is mounted on one longitudinal connecting assembly 4001, connects to the first adjusting cable 2001 and the second adjusting cable 2002, and can change an angle with the first adjusting cable 2001 and the second adjusting cable 2002.

The second driven rod 1003 may be used to lift the first adjusting cable 2001 and the second adjusting cable 2002, so as to prevent the first adjusting cable 2001 and the second adjusting cable 2002 having an excessive sink deformation due to the weight of the irrigation hoses 3. Those would understand that the excessive sink deformation of the first adjusting cable 2001 and the second adjusting cable 2002 may result in different heights of the sprinklers 4 from the ground in different parts of the span structure 2.

Another function of the second driven rod 1003 is to keep relative positions of the first adjusting cable 2001 and the second adjusting cable 2002 unchanged. In this case, when the first driving rod 1001 rotates, the second driven rod 1003 may keep being parallel to the first driving rod 1001, thus keep the first adjusting cable 2001 and the second adjusting cable 2002 being parallel with each other.

Figure 23:
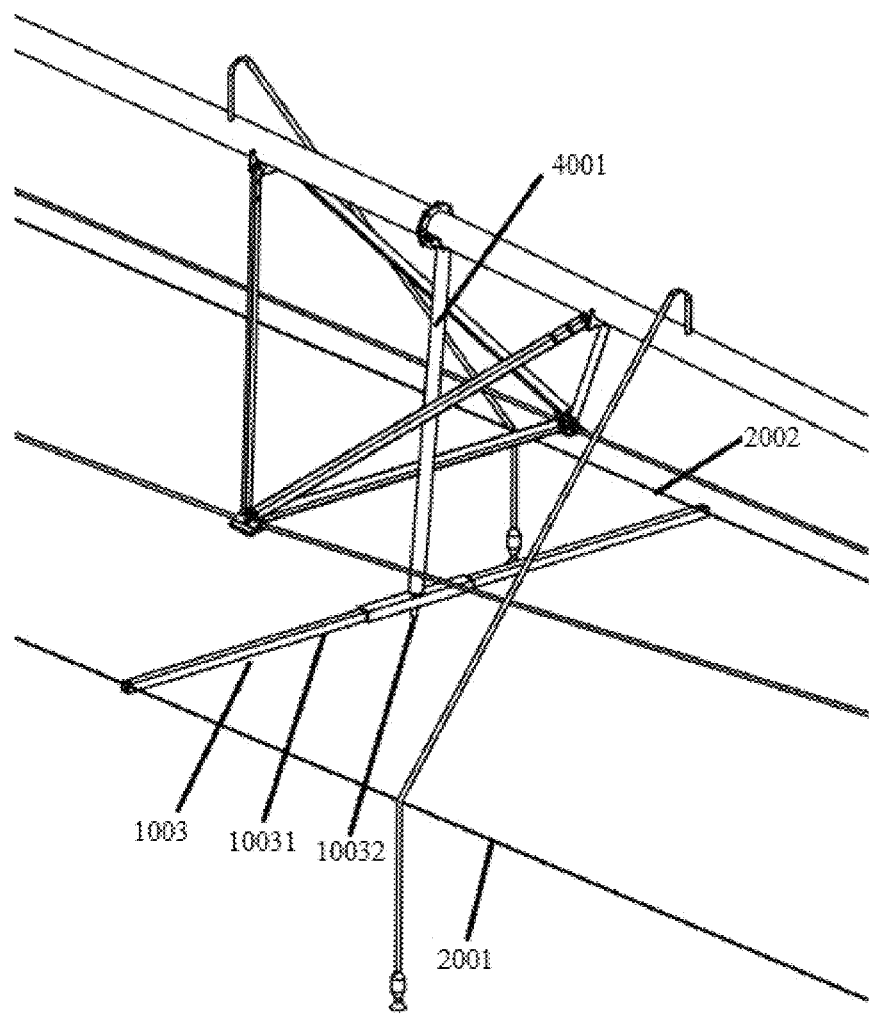
FIG. 23 is a schematic diagram illustrating the structure of a second driven rod 1003 according to an example of the present disclosure.

FIG. 23 is a schematic diagram illustrating the structure of a second driven rod 1003 according to an example of the present disclosure. As shown in FIG. 23, the second driven rod 1003 may include: a rotating assembly 10031 and a connecting rotating shaft 10032. The rotating assembly 10031 is connected to the vertical connecting assembly 4001 via the connecting rotating shaft 10032. A first end of the rotating assembly 10031 is connected to the first adjusting cable 2001, and can change an angle when the first cable 2001 moves. A second end of the rotating assembly 10031 is coupled to the second adjusting cable 2002 and is capable of changing the angle with the second adjusting cable 2002.

When the shape of the closed structure surrounded by the first driving rod 1001, the first driven rod 1002, the first adjusting cable 2001 and the second adjusting cable 2002 changes, both ends of the rotating assembly 10031 may be driven to move with the first adjusting cable 2001 and the second adjusting cable 2002, and the rotating assembly 10031 may rotate therewith.

Figure 24:
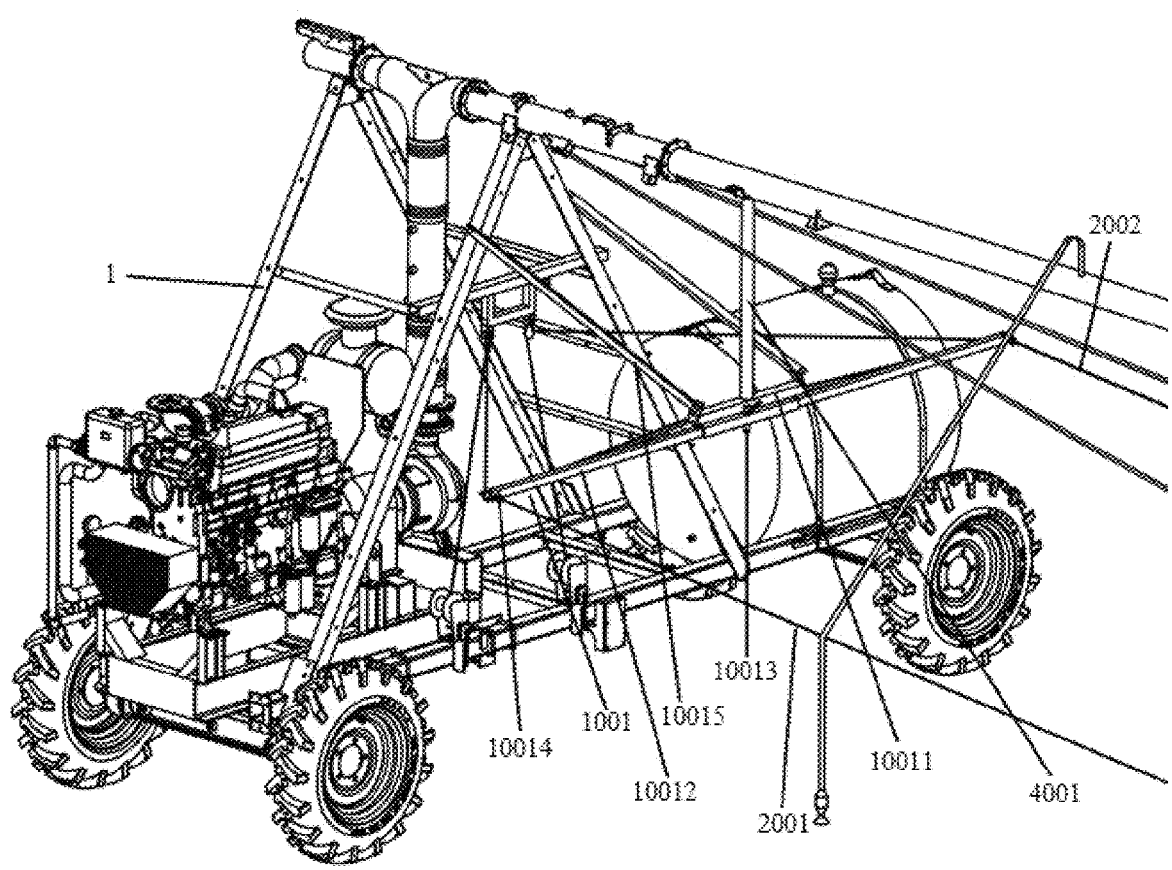
FIG. 24 is a schematic diagram illustrating the structure of a first driving rod according to an example of the present disclosure.

FIG. 24 is a schematic diagram illustrating the structure of a first driving rod according to an example of the present disclosure. As shown in FIG. 24, the first driving rod 1001 may include: a central assembly 10011, a rotating assembly 10012, a connecting rotating shaft 10013, connecting buckles 10014 and transverse connecting assemblies 10015.

The central assembly 10011 is connected to the longitudinal connecting assembly 4001, two ends of the central assembly 10011 are respectively connected to one transverse connecting assembly 10015, and are connected to the first tower 1 via the transverse connecting assembly 10015. The central assembly 10011 is connected to the rotating assembly 10012 via the connecting rotating shaft 10013. Two ends of the rotating assembly 10012 are mounted with the connecting buckles 10014. The first adjusting cable 2001 and the second adjusting cable 2002 are connected to the connecting buckles 10014. Therefore, the first adjustment cable 2001 and the second adjustment cable 2002 can adjust the angle with the rotating assembly 10012.

When the rotating assembly 10012 is driven to rotate, angles between the first adjusting cable 2001, the second adjusting cable 2002 and the rotating assembly 10012 may change accordingly. In this case, the distance between the first adjusting cable 2001 and the second adjusting cable 2002 may be shortened.

Figure 25:
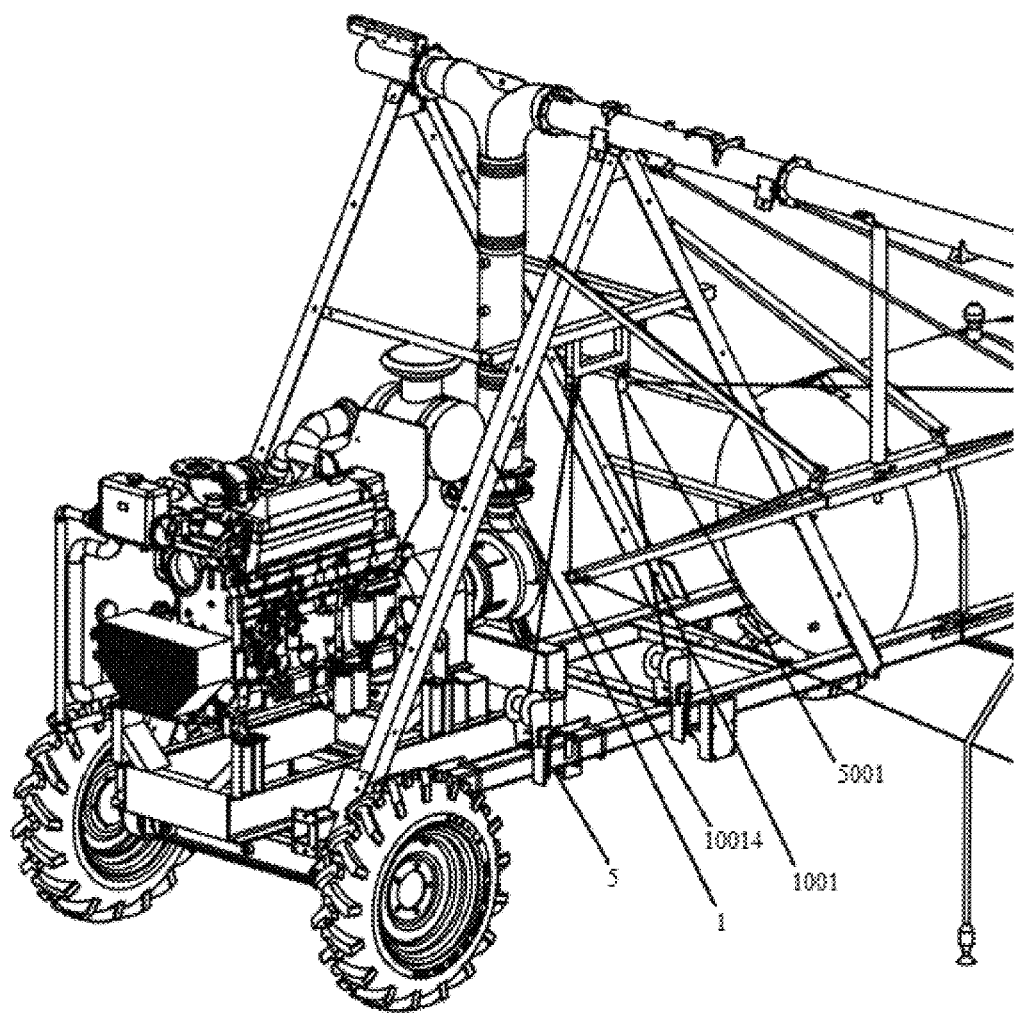
FIG. 25 is a schematic diagram illustrating the installation of a hand winch in accordance with an example of the present disclosure.

FIG. 25 is a schematic diagram illustrating the installation of a winch in accordance with an example of the present disclosure. As shown in FIG. 25, a fixing ring 5001 is mounted on the tower 1. The center pivot and linear irrigation system sprinkler height adjustment device may further include: winches 5, mounted on the first tower 1. The winches 5 are connected to the connecting buckles 10014 of the first driving rod 1001 via the fixing ring 5001 provided on the first tower 1.

According to an example of the present disclosure, there are two winches 5 mounted on the first tower 1. These two winches 5 are connected to the connecting buckles 10014 at two ends of the first driving rod 1001 via the fixing ring 5001 on the first tower 1. When one winch 5 is rotated clockwise, strands of this winch 5 are tensioned and shortened. In this case, the first driving rod 1001 may follow the pulling of the strands, and then rotates in a same direction. When the other winch 5 is rotated counterclockwise, the strands of this winch 5 are loosened and lengthened, so as to reduce the pulling force on the first driving rod 1001.

In this example, the distance between the first adjusting cable 2001 and the second adjusting cable 2002 can be adjusted by controlling the rotation angle of the first driving rod 1001 through the winches 5 so as to adjust the heights of the sprinklers 4. In this way, the flexibility of adjustment may be improved.

Figure 26:
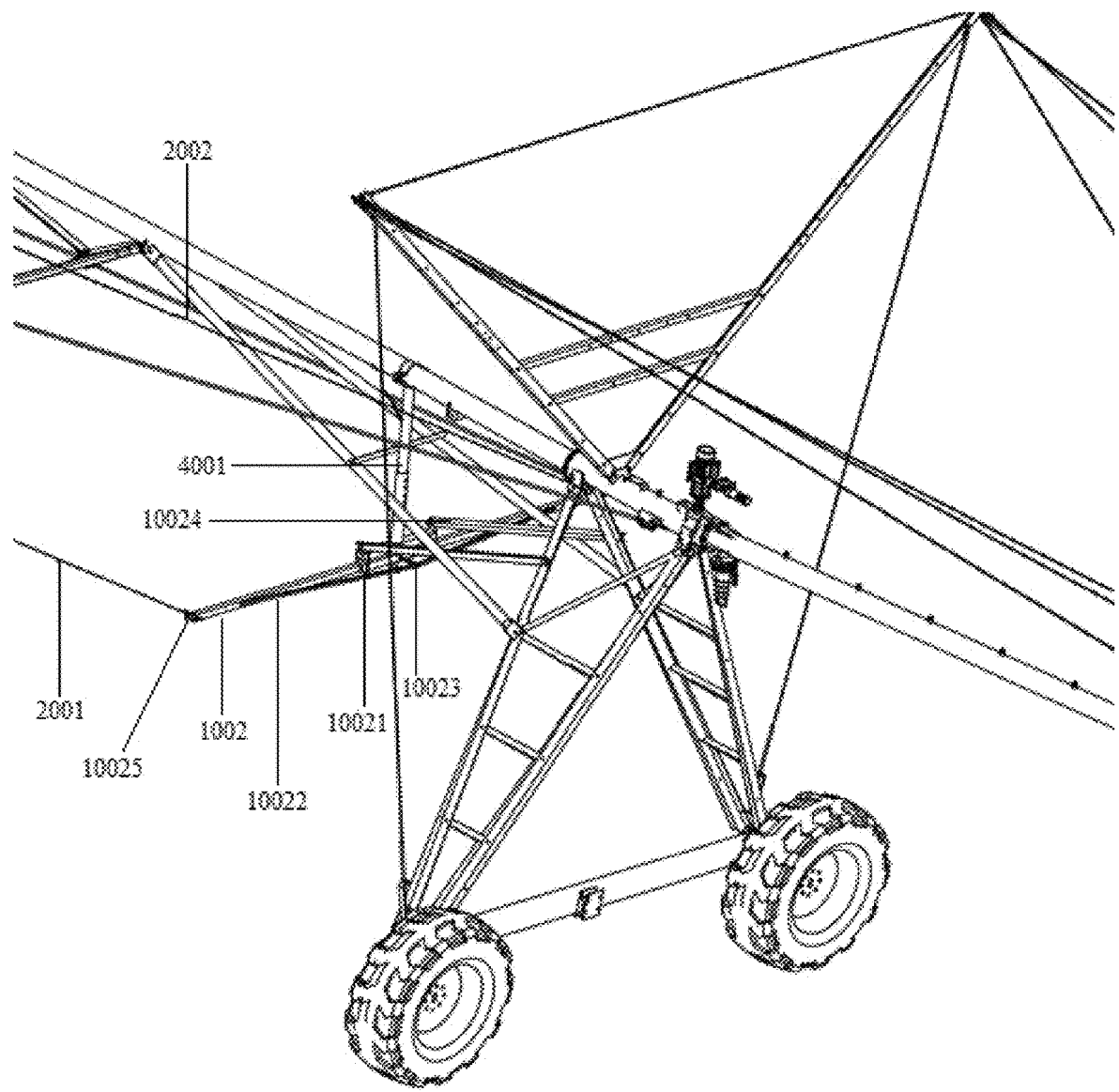
FIG. 26 is a schematic diagram illustrating the structure of a first driven rod according to an example of the present disclosure.

FIG. 26 is a schematic diagram illustrating the structure of a first driven rod according to an example of the present disclosure. As shown in FIG. 26, the first driven rod 1002 may include: a central assembly 10021, a rotating assembly 10022, a connecting rotating shaft 10023, transverse connecting assemblies 10024 and connecting buckles 10025.

The central assembly 10021 is connected to the longitudinal connecting assembly 4001. Two ends of the central assembly 10021 are respectively connected to one transverse connecting assembly 10024 and are connected to the second tower 1 via the transverse connecting assemblies 10024. The central assembly 10021 is coupled to the rotating assembly 10022 by the connecting rotating shaft 10023, and connecting buckles 10025 are installed at both ends of the rotating assembly 10022. The first adjusting cable 2001 and the second adjusting cable 2002 are connected to the connecting buckles 10025 and can change the angle with the rotating assembly 10022.

When the shape of the closed structure surrounded by the first driving rod 1001, the first driven rod 1002, the first adjusting cable 2001 and the second adjusting cable 2002 changes, both ends of the rotating assembly 10022 are driven to move with the first adjusting cable 2001 and the second adjusting cable 2002. Thus, the rotating assembly 10022 of the first driven rod 1002 may rotates accordingly.

Figure 27:
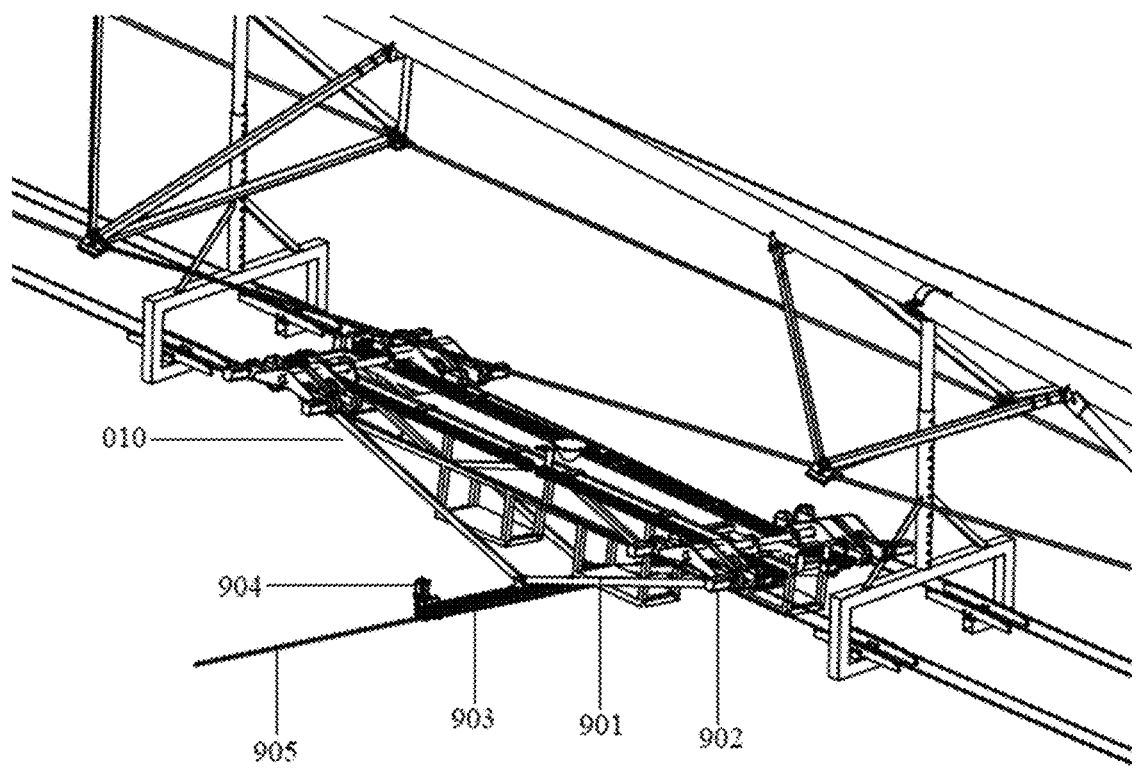
FIG. 27 is a schematic diagram illustrating the structure of a first adjustment module on the movable platform according to an example of the present disclosure.

In some examples of the present disclosure, As shown in FIG. 27, the plant protection and management system may further include: a first adjustment module and a second adjustment module.

The first adjustment module may include: a first guide rod disposed horizontally, and a first moving end disposed on the first guide rod slidably. Wherein, the first moving end is fixed onto the movable platform.

The second adjustment module may include: a second guide rod perpendicular to the first guide rod, and a second moving end disposed on the second guide rod slidably. Wherein, the second guide rod is fixed onto the first guide rod.

In some examples of the present disclosure, the first adjustment module is used to adjust the height of an applicator assembly in the plant protection and management system in a vertical direction. The second adjustment module is used to adjust the width of the applicator assembly in a horizontal direction.

FIG. 27 is a schematic diagram illustrating the structure of a first adjustment module according to an example of the present disclosure. As shown in FIG. 27, the first adjustment module may include: a foldable first guide rod 901 and first moving ends 902. The foldable first guide rod 901 is arranged along a horizontal direction. The first moving end 902 is slidingly fitted to the first guide rod 901. Specifically, four groups of the first moving ends 902 are arranged at four corners of the movable platform. The four groups of the first moving ends 902 may advance or retreat in the horizontal direction respectively. The four groups of first moving ends 902 are also fixed onto a movable platform 010 of the plant protection and management system. When the first adjustment module works, the four groups of first moving ends 902 may advance or retreat in the horizontal direction, and the first guide rod 901 can move up and down in a vertical direction.

The second adjustment module may include: a second guide rod 903 and a second moving end 904. The second guide rod 903 is disposed in a horizontal direction. The second moving end 904 is slidingly fitted onto the second guide rod 903. The arrangement direction of the second guide rod 903 is perpendicular to the first guide rod 901, and can stop at any vertical position as the position of the first guide rod 901 changes, such as an upper end, a lower end, etc. When one end of the first guide rod 901 moves with the first moving ends 902, the second adjustment module can be driven to move in the vertical direction. In this example, the applicator assembly may include: an applicator bar 905. The applicator bar 905 is disposed at the second moving end 904 and is movable with the second moving end 904 on the second guide bar 903. A plurality of sprayers or orifices are evenly distributed on applicator bar 905 to perform an application to the crops.

In operations, adjustment of the position of the applicator bar 905 may be accomplished by the first adjustment module and the second adjustment module. Specifically, if it is desired to adjust the vertical position of the applicator bar 905, the first adjustment module may operate to move the first guide rod 901 to carry the second adjustment module to move in a vertical direction. In this case, the vertical position of the applicator bar 905 on the second moving end 904 may be adjusted accordingly. If it is desired to adjust the horizontal position of the applicator bar 905, the second adjustment module may operate to move the second moving end 904 to carry the applicator bar 905 disposed on the second guide rod 903 to move along the horizontal direction. In this case, the horizontal position of the applicator bar 905 may be adjusted.

Specifically, a primary function of the second adjustment module is to control a spray amplitude of the applicator bar 905 and to circumvent the tower 1. When the applicator assembly of the present disclosure operates, a fan-shaped area may be formed. Therefore, different widths of the spray amplitude are required at different operation positions along the movable platform 010. The tower 1 presents a triangular structure in the direction of travel of the movable platform 010, and the higher the relative position of the second adjustment module is, the smaller the width is that can be passed through. Therefore, the second adjusting module can take account of the spray width and avoid the tower 1 by telescoping.

Figure 28:
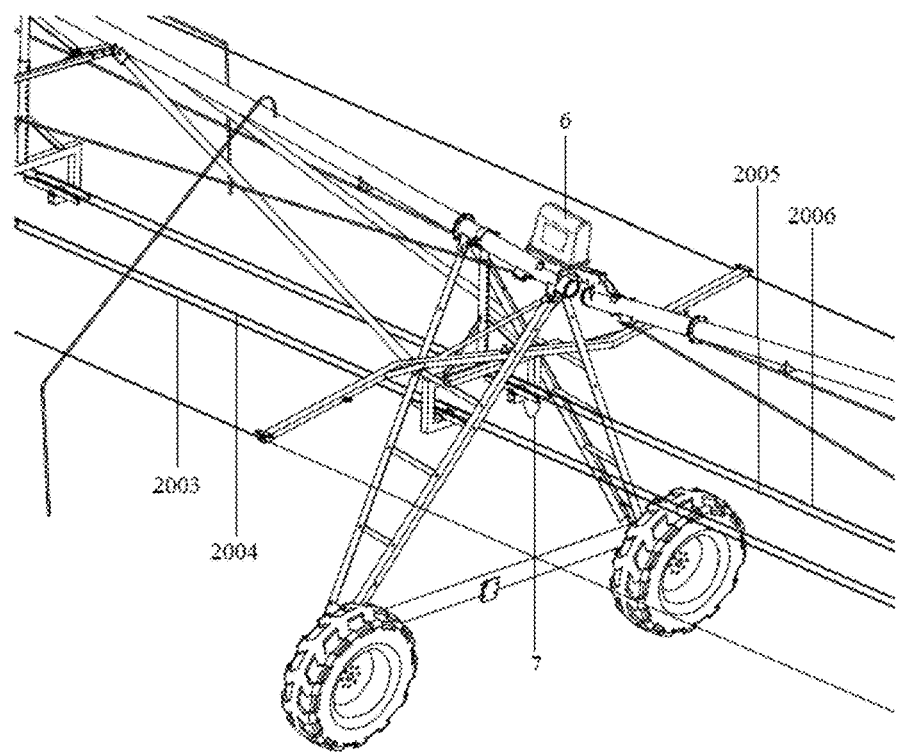
FIG. 28 is a schematic diagram illustrating the structure of a sprinkler height adjustment device according to an example of the present disclosure.

FIG. 28 is a schematic diagram illustrating the structure of an adjustment device according to an example of the present disclosure. As shown in FIG. 28, the plant protection and management system may further include: a power supply device. The power supply device may include: a tower box 6, supporting cables and power supply lines 7. The tower box 6 is used for driving the towers 1 to move and supplying power to the supporting cables. The supporting cables are used for supporting the movable platform 010 to move and receiving power supply. The power supply lines 7 are used for connecting the tower box 6 and the supporting cables to supply power to the supporting cables.

In operations, the tower box 6 may be used for driving the towers 1 to move, and may be used to supply power to the supporting cables via the power supply lines 7. Wherein, all the marks 2003, 2004, 2005 and 2006 in FIG. 28 are the supporting cables of the movable platform. One function of these supporting cables is to act as moving guide rails to support the movable platform to move. Another function of these supporting cables is to act as power supply lines for the movable platform. Specifically, any two of the support cables can be selected to function as power supply support cables as desired. For example, the support cables with remarks 2004 and 2005 are selected as the power supply support cables. No matter which two groups of supporting cables are selected, the supporting cables which are connected with electricity are insulated with the power supply driving device composed of metal parts by insulation measures. For the sake of safety, it is generally chosen to convert the alternating current in the control circuit into direct current with several different voltage levels of 24V, 36V and 48V, and to access the supporting cable. Taking into account a voltage drop, the support cables may take power from the tower box 6 on the tower at intervals. A transformer may be installed in the tower box to convert the voltage from 110V AC or 220V AC in the center pivot and linear irrigation system to 36-48V DC for power supply. It is not necessary for the tower box 6 on each tower 1 to supply the supporting cables, but they are supplied in a spaced manner according to the actual load situation.

In operations, the power to move the movable platform 010 is derived from the power provided by the support cables. In the present example, there are four supporting cables, and any two or four of them can be selected as power supply lines for the movable platform 010 according to the requirements of actual energy consumption. The support cables provide 36V/48V DC power to the movable platform 010 via the collector wheels or carbon brushes in the roller set.

Figure 29:
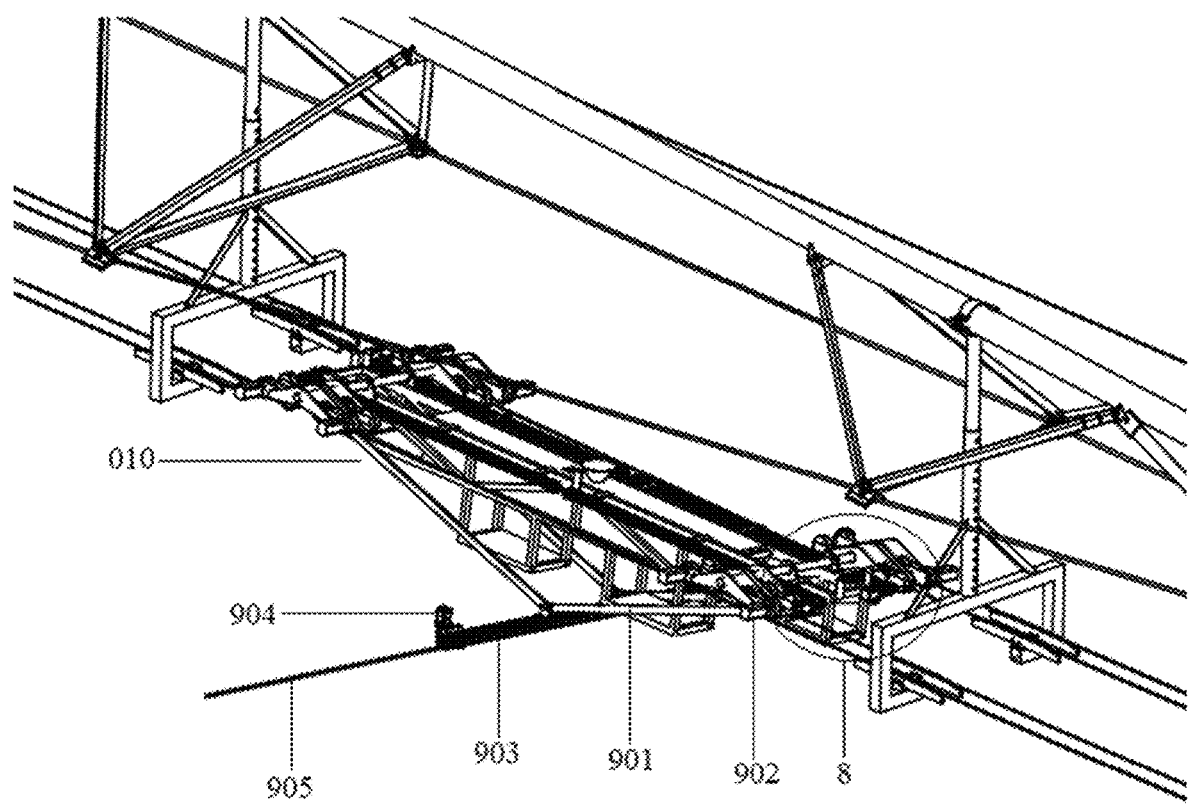
FIG. 29 is a schematic diagram illustrating the structure of a power supply device according to an example of the present disclosure.

FIG. 29 is a schematic diagram illustrating the structure of a power supply device according to an example of the present disclosure. As shown in FIG. 29, the power supply device may further include: a running wheel set 8.

The running wheel set 8 is used for collecting power from the supporting cables and controlling the movable platform 010 to move.

The running wheel set 8 is connected to the supporting cables by means of wheels.

The running wheel set 8 is composed of several wheels, which can distribute weight and reduce the vibration problem generated by the movable platform 010 while it is moving. The wheels in the running wheel set 8 are made of conducting materials.

The movable platform 010 or other movable parts of the plant protection and management system may collect power from the running wheel set 8 on the supporting cables. The use of conducting materials, such as aluminum, copper, and etc. for the wheels on the supporting cables with electricity running can ensure that electricity can be transferred from the supporting cables stably. Moreover, the power supplied is greater than the energy consumption of the movable platform 010 so that the entire movable platform 010 can theoretically operate without charging. The energy consumption may be different when the movable platform 010 performs different functional components. Adequate assessment of the arrangement of tower box 6 to boost the power supply performed prior to system installation.

One of ordinary skill in the art will appreciate that the discussion of any of the above examples is merely exemplary and is not intended to imply that the scope of the disclosure, including the claims, is limited to these examples. Combinations between the features of the above examples are also possible within the contemplation of the present disclosure. The steps may be implemented in any order, and there are many other variations to different aspects of the disclosure as described above which are not provided in detail for the sake of brevity.

The disclosed examples are intended to embrace all such alterations, modifications and variations that fall within the broad scope of the appended claims. Accordingly, it is intended to embrace all such alternatives, modifications, equivalents, and variations that fall within the spirit and scope of the present disclosure.

What is claimed is:

1. A plant protection and management system for a center pivot and linear irrigation system, comprising: at least two towers sequentially arranged at intervals, at least one span structure between the at least two towers, a movable platform and a transport assembly; wherein
the transport assembly is configured to function as a track on which the movable platform moves along the span structure; and
the movable platform is configured to provide at least one of an application unit, a seeding-fertilizer spreader unit or a monitoring unit; wherein,
the transport assembly comprises:
a first supporting cable extending between the at least two towers;
a first driving wheel arranged on any one of the at least two towers; wherein the first driving wheel is connected with a geared motor;
a first driven wheel arranged on any other one of the at least two towers;
a first moving cable wound between the first driving wheel and the first driven wheel; wherein the first moving cable is connected with the movable platform and removable from the movable platform; and
a connecting frame with one end connecting to the first supporting cable in a rolling manner through a first roller set and with the other end connecting to the movable platform through a bogie.

2. The plant protection and management system of claim 1, wherein the transport assembly comprises:
a second supporting cable extending between the at least two towers; wherein the second supporting cable provides power to the movable platform and/or the transport assembly; wherein
the movable platform is connected to the second supporting cable in a rolling mode through a second roller set.

3. The plant protection and management system of claim 1, wherein the application unit comprises: an application assembly, a first linear module and a second linear module; wherein
the application assembly is configured to spray or spread agricultural chemicals or fertilizers;
the first linear module comprises a first guide rod arranged in a vertical direction and a first moving end arranged on the first guide rod in a sliding manner; wherein the first moving end is fixed on the movable platform; and
the second linear module comprises a second guide rod arranged perpendicular to the first guide rod and a second moving end arranged on the second guide rod in a sliding manner; wherein the second guide rod is fixed on the first guide rod; and the application assembly is disposed on the second moving end.

4. The plant protection and management system of claim 3, wherein the application assembly comprises:
an application rod, connected with the second moving end; wherein a plurality of spray heads or outlet holes are distributed on the application rod.

5. The plant protection and management system of claim 3, further comprising:
a supply tank; wherein the supply tank is arranged on and is removable from the span structure; the supply tank is connected with a supply system through a supply pipe; and the supply tank is provided with an outlet.

6. The plant protection and management system of claim 5, wherein the supply tank is further provided with a supply device; the output end of the supply device is connected with the outlet of the supply tank.

7. The plant protection and management system of claim 5, further comprising: a ring-shaped transit storage tank connected with the supply system through the supply pipe; wherein,
an annular surface of the ring-shaped transit storage tank facing the span structure is in rotary connection with other parts of the ring-shaped transit storage tank;
self-adaptive sealing rubber is arranged between the annular surface and the other parts of the ring-shaped transit storage tank;
the annular surface is provided with an outlet; and
the outlet is connected with the supply tank through the supply pipe.

8. The plant protection and management system of claim 5, further comprising: a transportation assembly; wherein the transport assembly comprises:
- a transport trolley; wherein the transport trolley is provided with wheels and is configured to move or be moved by a trailer or hooked with a linear irrigation system;
- a supply tank configured to store agriculture chemicals; wherein the supply tank and is connected with the supply tank through a supply pipeline;
- a first lifting assembly; wherein the first lifting assembly is connected with the supply tank and is configured to drive the supply tank to lift; and
- a rail; wherein the rail is arranged on the transport trolley through the second lifting assembly and is configured to work with the transport assembly to support and fix the movable platform.

9. The plant protection and management system of claim 1, further comprising: a secondary application unit; wherein the secondary application unit comprises:
- an over hang with one of its ends fixed on a tower at an end position of the at least two towers; wherein the over hang extends along an extending direction away from the span structure; and the other end of the over hang is suspended and fixed to the tower at the end position through a suspension cable;
- a supporting guide rail extending along an extending direction of the over hang and fixed on the over hang;
- a second driving wheel, connected to a secondary application motor arranged on the tower at the end position through a first secondary wheel shaft;
- a second driven wheel, connected to the other end of the over hang through a second secondary wheel shaft;
- a secondary cable, wound between the second driving wheel and the second driven wheel;
- at least one sliding frame, sequentially arranged on the supporting guide rail in a sliding mode; wherein a sliding frame furthest away from one end of the supporting guide rail is fixed on the secondary cable;
- a secondary application rod, arranged on the sliding frame furthest away from one end of the supporting guide rail; wherein a plurality of secondary spray heads is distributed on the secondary application rod; and
- a secondary supply pipe, with one end connected with a secondary storage tank arranged on the tower at the end position, and with the other end connected with the secondary application rod; wherein the part between two ends of the secondary supply pipe is fixed on the at least one sliding frames in sequence.

10. The plant protection and management system of claim 1, wherein the seeding-fertilizer spreader unit comprises:
- a seed storage box, configured to store seeds or fertilizers; wherein the seed storage box is in a funnel shape, and the bottom of the seed storage box is provided with an outlet for discharging seeds;
- a spreading disc, positioned below the seed storage box and opposite to the outlet; wherein the spreading disc is provided with a plurality of spreading vanes for limiting seed discharging directions; and
- a seeding-fertilizer spreader motor, connected to the spreading disc; wherein the seeding-fertilizer spreader motor is configured to drive the spreading disc to rotate taking the center of the spreading disc as a rotation center.

11. The plant protection and management system of claim 1, wherein the monitoring unit comprises: at least one of an image acquisition device, a temperature sensor, a humidity sensor, a crop growth sensor, a pest monitoring sensor or a crop disease monitoring sensor.

12. The plant protection and management system of claim 2, further comprising: a material transport unit; wherein the material transport unit is connected to the second supporting cable in a rolling mode through a third roller set.

13. The plant protection and management system of claim 2, wherein the transport assembly further comprises:
- an end fixing frame, fixed on the span structure; wherein the end fixing frame is provided with a guide rail groove; wherein
- an end of the second supporting cable is fixed on the guide rail groove; and
- the movable platform rolls in or out of the second supporting cable through the guide rail groove.

14. The plant protection and management system of claim 13, wherein the transport assembly further comprises:
- a lifting cable, arranged at the tower at the end position and connected with the movable platform; wherein the lifting cable is configured to lift the movable platform through retraction and extension, and drive the movable platform to roll into the second supporting cable through the guide rail groove when the movable platform is lifted to the position of the end fixing frame.

15. The plant protection and management system of claim 1, wherein a plurality of hoses arranged at intervals on the span structure; a plurality of sprinklers; wherein one sprinkler is provided at an end of each irrigation hose;
- the center pivot and linear irrigation system sprinkler height adjustment device comprises: a first driving rod, a first driven rod, a first adjusting cable, a second adjusting cable and irrigation hose sliding sleeves;
- the first driving rod connects to a first tower of the at least two towers;
- the first driven rod connects to a second tower of the at least two towers;
- the first adjusting cable connects a first end of the first driving rod and a first end of the first driven rod;
- the second adjusting cable connects a second end of the first driving rod and a second end of the first driven rod;
- the irrigation hose sliding sleeves are arranged at intervals on the first adjusting cable and the second adjusting cable;
- each irrigation hose slides through an irrigation hose sliding sleeve, and an end of the irrigation hose hangs down naturally; and
- when the first driving rod is driven to rotate, a relative distance between the first adjusting cable and the second adjusting cable changes, and heights of the plurality of sprinklers are adjusted.

16. The plant protection and management system of claim 15, wherein the center pivot and linear irrigation system adjustment device further comprises:
- a plurality of longitudinal connecting assemblies arranged at intervals on the span structure;
- a plurality of second driven rods; wherein
- each second driven rod is mounted on one longitudinal connecting assembly, and is used for supporting the first adjusting cable and the second adjusting cable.

17. The plant protection and management system of claim 16, wherein the first driving rod comprises:
- a central assembly, a rotating assembly, a connecting rotating shaft, connecting buckles and transverse connecting assemblies; wherein
- the central assembly is connected to one longitudinal connecting assembly;

two ends of the central assembly are respectively connected to one transverse connecting assembly and are connected to the first tower via the transverse connecting assembly;

the central assembly is connected to the rotating assembly via the connecting rotating shaft;

two ends of the rotating assembly are mounted with the connecting buckles; and the first adjusting cable and the second adjusting cable are connected to the connecting buckles.

18. The plant protection and management system of claim 16, wherein the first driven rod comprises: a central assembly, a rotating assembly, a connecting rotating shaft, transverse connecting assemblies and connecting buckles;

the central assembly is connected to one longitudinal connecting assembly;

two ends of the central assembly are connected to one transverse connecting assembly respectively and are connected to the second tower via the transverse connecting assemblies;

the central assembly is coupled to the rotating assembly by the connecting rotating shaft;

the connecting buckles are installed at both ends of the rotating assembly;

the first adjusting cable and the second adjusting cable are connected to the connecting buckles; and when the shape of the closed structure surrounded by the first driving rod, the first driven rod, the first adjusting cable and the second adjusting cable changes, both ends of the rotating assembly are driven to move with the first adjusting cable and the second adjusting cable; and the rotating assembly of the first driven rod is driven to rotate.

19. The plant protection and management system of claim 16, wherein the second driven rod comprises: a rotating assembly and a connecting rotating shaft;

the rotating assembly is connected to the longitudinal connecting assembly via the connecting rotating shaft;

a first end of the second driven rod is connected to the first adjusting cable;

a second end of the second driven rod is connected to the second adjusting cable; and when the shape of the closed structure surrounded by the first driving rod, the first driven rod, the first adjusting cable and the second adjusting cable changes, both ends of the second driven rod may be driven to move with the first adjusting cable and the second adjusting cable; and the second driven rod is driven to rotate.

20. The plant protection and management system of claim 2, further comprising: a power supply device; wherein the power supply device comprises a tower box; supporting cables and power supply lines;

the tower box is used for driving the at least two towers to move and supplying power to the supporting cables; and the power supply lines are used for connecting the tower box and the second supporting cables to supply power to the second supporting cables.

\* \* \* \* \*